United States Patent
Murphy et al.

(10) Patent No.: US 12,456,006 B2
(45) Date of Patent: Oct. 28, 2025

(54) COPY-PASTE TRIGGERED FORMULA GENERATION

(71) Applicant: Workday, Inc., Pleasanton, CA (US)

(72) Inventors: William James Murphy, Boulder, CO (US); Leonard Karpel, Boulder, CO (US)

(73) Assignee: Workday, Inc., Pleasanton, CA (US)

( * ) Notice: Subject to any disclaimer, the term of this patent is extended or adjusted under 35 U.S.C. 154(b) by 240 days.

(21) Appl. No.: 17/153,745

(22) Filed: Jan. 20, 2021

(65) Prior Publication Data

US 2022/0229975 A1 Jul. 21, 2022

(51) Int. Cl.
| | |
|---|---|
| G06F 17/00 | (2019.01) |
| G06F 40/18 | (2020.01) |
| G06F 40/205 | (2020.01) |
| G06F 40/237 | (2020.01) |

(52) U.S. Cl.
CPC ............ *G06F 40/18* (2020.01); *G06F 40/205* (2020.01); *G06F 40/237* (2020.01)

(58) Field of Classification Search
CPC ...... G06F 40/18; G06F 40/237; G06F 40/205; G06F 40/274; G06F 40/284
USPC ........................................................ 715/219
See application file for complete search history.

(56) References Cited

U.S. PATENT DOCUMENTS

| | | | |
|---|---|---|---|
| 9,075,787 B2 | 7/2015 | Schödl | |
| 9,489,368 B2* | 11/2016 | Otero | G06F 40/18 |
| 12,094,018 B1* | 9/2024 | O'Malley | G06Q 50/184 |
| 2002/0055952 A1* | 5/2002 | Clancey | G06Q 40/12 |
| | | | 715/219 |
| 2004/0133568 A1 | 7/2004 | Witkowski | |
| 2005/0131928 A1 | 6/2005 | Gauthey | |
| 2006/0129929 A1* | 6/2006 | Weber | G06F 40/18 |
| | | | 715/267 |
| 2006/0173917 A1* | 8/2006 | Kalmick | G06Q 10/109 |
| | | | 709/224 |
| 2007/0055922 A1* | 3/2007 | Martynov | G06F 16/3322 |
| | | | 715/209 |
| 2008/0115105 A1 | 5/2008 | Garrett | |
| 2008/0244508 A1 | 10/2008 | Mantuano | |
| 2009/0150426 A1 | 6/2009 | Cannon | |
| 2012/0137273 A1 | 5/2012 | Meijler | |
| 2012/0189203 A1 | 7/2012 | Lin | |

(Continued)

OTHER PUBLICATIONS

Zhongjun Jin, Michael R. Anderson, Michael Cafarella, and H. V. Jagadish. 2017. Foofah: Transforming Data By Example. In Proceedings of the 2017 ACM International Conference on Management of Data (SIGMOD '17). (Year: 2017).*

(Continued)

*Primary Examiner* — Jason T Edwards
(74) *Attorney, Agent, or Firm* — Cooper Legal Group, LLC

(57) ABSTRACT

A system includes an interface configured to receive a paste-to data cell. The system includes a processor configured to: determine whether there is an exact match key for a copy-from data set; in response to there not being the exact match key for the copy-from data set, determine whether there is a smart formula for the copy-from data set; and in response to there being the smart formula for the copy-from data set, provide the smart formula for the copy-from data set to a formula cell. The system includes a memory coupled to the processor and configured to provide the processor with instructions.

15 Claims, 16 Drawing Sheets

The example paste-to data set auto-filled based on a generated smart lookup formula

| | B | C | D | E | F | G |
|---|---|---|---|---|---|---|
| | Text Field 1 | Text Field 2 | Text Field 3 | Text Field 4 | Formula 1 | Formula 2 |
| 8 | Baker | John | Boulder | 111-22-3333 | 111223333 | qualified |
| 9 | Cooper | Sandra | Boulder | 222-33-4444 | 222334444 | rehire |
| 10 | Jones | Miles | Millinocket | 333-44-5555 | 333445555 | retired |
| 11 | Parker | Amy | Dahlonega | 444-55-6666 | 444556666 | pay benefits |
| 12 | Smith | Peter | Chicago | 555-66-7777 | 555667777 | rehire |
| 13 | Carter | Crissy | SFO | 666-77-8888 | 666778888 | qualified |

1340

(56) References Cited

U.S. PATENT DOCUMENTS

| | | |
|---|---|---|
| 2013/0055058 A1 | 2/2013 | Leong |
| 2013/0346844 A1* | 12/2013 | Graepel ................. G06F 40/18 |
| | | 715/219 |
| 2014/0372854 A1* | 12/2014 | Otero ..................... G06F 40/18 |
| | | 715/219 |
| 2014/0372857 A1 | 12/2014 | Otero |
| 2015/0169530 A1 | 6/2015 | Otero |
| 2016/0055139 A1 | 2/2016 | Creason |
| 2016/0371244 A1 | 12/2016 | Chakra |
| 2017/0116179 A1* | 4/2017 | Gagné-Langevin ....................... |
| | | G06F 40/106 |
| 2017/0124053 A1 | 5/2017 | Campbell |
| 2017/0124058 A1* | 5/2017 | Otero ................... G06F 3/0482 |
| 2018/0005122 A1 | 1/2018 | McDaid |
| 2018/0113873 A1* | 4/2018 | Gulwani ................. G06F 40/16 |
| 2018/0225270 A1* | 8/2018 | Bhide .................... G06F 40/16 |
| 2019/0121847 A1 | 4/2019 | Castañeda-Villagrán |
| 2019/0147031 A1* | 5/2019 | Dvorak .................. G06F 40/18 |
| | | 715/219 |
| 2019/0251158 A1 | 8/2019 | Toronto |
| 2019/0340219 A1 | 11/2019 | Schoedl |
| 2020/0265113 A1 | 8/2020 | Dubey |

OTHER PUBLICATIONS

Harris, W.R., & Gulwani, S. (2011). Spreadsheet table transformations from examples. ACM-SIGPLAN Symposium on Programming Language Design and Implementation. (Year: 2011).*

Ives, Z.G., Knoblock, C.A., Minton, S., Jacob, M., Talukdar, P.P., Tuchinda, R., Ambite, J., Muslea, M., & Gazen, C. (2009). Interactive Data Integration through Smart Copy & Paste. ArXiv, abs/0909.1769. (Year: 2009).*

Walkenbach, J.,"Excel 2013 Formulas," 2013, John Wiley & Sons, Inc. Chapter 8: Using Lookup Functions pp. 6-39 of 39 (manually numbered) (Year: 2013).*

Jelen, B.,"Excel: The New XLOOKUP Function," (2019), Strategic Finance, pp. 56-58. (Year: 2019).*

MacDonald, M.,"Excel 2013: The Missing Manual," (2013), O'Reilly Media, Inc. "Chapter 12: Lookup, Reference, and Information Functions", 44 pages total (manually numbered). (Year: 2013).*

N. Macedo, H. Pacheco, N. R. Sousa and A. Cunha, "Bidirectional spreadsheet formulas," 2014 IEEE Symposium on Visual Languages and Human-Centric Computing (VL/HCC), Melbourne, VIC, Australia, 2014, pp. 161-168, doi: 10.1109/VLHCC.2014.6883041. (Year: 2014).*

Jelen, B.,"Excel, the new lookup function," SF Magazine.com, pp. 56-57, Oct. 2019 (Year: 2019).*

Clark, M.,Microsoft's Making Excel Formulas Even Easier, The Verge, Dec. 27, 2022, 7 pages. (Year: 2022).*

Gulwani_et_al.,"Spreadsheet Data Manipulation Using Examples," Aug. 2012, ACM, pp. 97-105. (Year: 2012).*

Gomes, M.,"Power Automate: What is a Key col. in Excel?," Nov. 21, 2022, 22 pages. (Year: 2022).*

Sumit Gulwani, William R. Harris, and Rishabh Singh. 2012. Spreadsheet data manipulation using examples. Commun. ACM 55, 8 (Aug. 2012), 97-105. (Year: 2012).*

* cited by examiner

700

FIG. 7A: An example data set

|    | B            | C            | D            | E            | F              |
|----|--------------|--------------|--------------|--------------|----------------|
|    | Text Field 1 | Text Field 2 | Text Field 3 | Text Field 4 | Formula Column |
| 8  | Baker        | John         | Boulder      | 111-22-3333  | Formula cell   |
| 9  | Cooper       | Sandra       | Boulder      | 222-33-4444  |                |
| 10 | Jones        | Miles        | Millinocket  | 333-44-5555  |                |
| 11 | Parker       | Amy          | Dahlonega    | 444-55-6666  |                |
| 12 | Smith        | Peter        | Chicago      | 555-66-7777  |                |
| 13 | Carter       | Crissy       | SFO          | 666-77-8888  |                |

702

720

FIG. 7B: An example code set

*Example transform functions* 722

LOWER(F)
UPPER(F)
PROPER(F)

*Example parsing formulas* 724

LIST.GET(SPLIT(F,Y),1)
LIST.GET(SPLIT(F,Y),2)
LET(X,SPLIT(F,Y),LIST.GET(X,LIST.SIZE(X)))
REGEXREPLACE(F,Y,NEW)
LEFT(F,NUM)
REPLACE (F,START,NUM,NEW)

*Example delimiters* 726

(.)
(,)
( )
(.)
(-)
(/)
(:)

800

FIG. 8A: The example data set with an example user input string

|  | B | C | D | E | F |
|---|---|---|---|---|---|
|  | Text Field 1 | Text Field 2 | Text Field 3 | Text Field 4 | Formula Column |
| 8 | Baker | John | Boulder | 111-22-3333 | jbaker@email.com |
| 9 | Cooper | Sandra | Boulder | 222-33-4444 |  |
| 10 | Jones | Miles | Millinocket | 333-44-5555 |  |
| 11 | Parker | Amy | Dahlonega | 444-55-6666 |  |
| 12 | Smith | Peter | Chicago | 555-66-7777 |  |
| 13 | Carter | Crissy | SFO | 666-77-8888 |  |

802

Fig. 8B: A portion of the example data set

|  | B | C | D | E |
|---|---|---|---|---|
|  | Text Field 1 | Text Field 2 | Text Field 3 | Text Field 4 |
| 8 | Baker | John | Boulder | 111-22-3333 |

820

Fig. 8C: A first formula vocabulary generated from the portion of the example data set {B8: Baker}
{C8: John}
{D8: Boulder}
{E8: 111-22-3333}

840

Fig. 8D: A second formula vocabulary generated from the first formula vocabulary 862
864 {B8: Baker}
{C8: John} 866
868 {D8: Boulder}
{E8: 111-22-3333}
{LOWER(B8): baker}
{UPPER(B8): BAKER}
{LOWER(C8): john}
{UPPER(C8): JOHN}
{LOWER(D8): boulder}
{UPPER(D8): BOULDER}

860

Fig. 9A: A lexicon generated from the second formula vocabulary

{B8: Baker}
{C8: John}
{D8: Boulder}
{E8: 111-22-3333}
{LOWER(B8): baker}
{UPPER(B8): BAKER}
{LOWER(C8): john}
{UPPER(C8): JOHN}
{LOWER(D8): boulder}
{UPPER(D8): BOULDER}
{LIST.GET(SPLIT(E8,"-"),1): 111}
{LIST.GET(SPLIT(E8,"-"),2): 22}
{LET(X,SPLIT(E8,"-"),LIST.GET(X,LIST.SIZE(X))): 3333}

900

Fig 9B: Evaluation formulas generated from the lexicon

{LEFT(LOWER(C8),1)}
{LEFT(LOWER(C8),1)}&{LOWER(B8)}
{LEFT(LOWER(C8),1)}&{LOWER(B8)}&"@"
{LEFT(LOWER(C8),1)}&{LOWER(B8)}&"@e"
{LEFT(LOWER(C8),1)}&{LOWER(B8)}&"@em"
{LEFT(LOWER(C8),1)}&{LOWER(B8)}&"@ema"
{LEFT(LOWER(C8),1)}&{LOWER(B8)}&"@email"
{LEFT(LOWER(C8),1)}&{LOWER(B8)}&"@email"
{LEFT(LOWER(C8),1)}&{LOWER(B8)}&"@email."
{LEFT(LOWER(C8),1)}&{LOWER(B8)}&"@email.c"
{LEFT(LOWER(C8),1)}&{LOWER(B8)}&"@email.co"
{LEFT(LOWER(C8),1)}&{LOWER(B8)}&"@email.com"

920

922

FIG. 10A: A portion of a second example data set with a second example user input string

| | I | J |
|---|---|---|
| | Text Field 1 | Formula Column |
| 14 | Ronnie Anderson, UK | RAnderson |

1000, 1002, 1004

Fig. 10B: A first formula vocabulary generated from the portion of the second example data set 1020
{I14: Ronnie Anderson, UK}

Fig. 10C: A second formula vocabulary generated from the first formula vocabulary 1040
{I14: Ronnie Anderson, UK} — 1042
{LOWER(I14): ronnie anderson, uk}
{UPPER(I14): RONNIE ANDERSON, UK}
{PROPER(I14): Ronnie Anderson, Uk}

Fig. 10D: A lexicon generated from the second formula vocabulary

1060
{I14: Ronnie Anderson, UK}
{LOWER(I14): ronnie anderson, uk}
{UPPER(I14): RONNIE ANDERSON, UK}
{PROPER(I14): Ronnie Anderson, Uk}
{LIST.GET(SPLIT(I14," "),1): Ronnie}
{LIST.GET(SPLIT(I14," "),2): Anderson,}
{LET(X,SPLIT(I14," "),LIST.GET(X,LIST.SIZE(X))): UK}
{LIST.GET(SPLIT(I14,","),1): Ronnie Anderson}  1062
{LIST.GET(SPLIT(I14,","),2): UK}
{LIST.GET(SPLIT(I14,"[, ]"),2): Anderson}
{LIST.GET(SPLIT(LOWER(I14)," "),1): ronnie}
{LIST.GET(SPLIT(LOWER(I14)," "),2): anderson,}
{LET(X,SPLIT(LOWER(I14)," "),LIST.GET(X,LIST.SIZE(X))): uk}
{LIST.GET(SPLIT(LOWER(I14),","),1): ronnie anderson}
{LIST.GET(SPLIT(LOWER(I14),","),2): uk}
{LIST.GET(SPLIT(LOWER(I14),"[, ]"),2): anderson}
{LIST.GET(SPLIT(UPPER(I14)," "),1): RONNIE}
{LIST.GET(SPLIT(UPPER(I14)," "),2): ANDERSON,}
{LIST.GET(SPLIT(UPPER(I14),","),1): RONNIE ANDERSON}
{LIST.GET(SPLIT(UPPER(I14),"[, ]"),2): ANDERSON}
{LET(X,SPLIT(PROPER(I14)," "),LIST.GET(X,LIST.SIZE(X))): Uk}
{LIST.GET(SPLIT(PROPER(I14),","),2): Uk}

Fig 10E: Evaluation formulas generated from the lexicon

1080
{LEFT(I14,1)}
{LEFT(I14,1)}&{LIST.GET(SPLIT(I14,"[, ]"),2)} — 1082

FIG. 11A: The example data set with another example user input string

| | B | C | D | E | F |
|---|---|---|---|---|---|
| | Text Field 1 | Text Field 2 | Text Field 3 | Text Field 4 | Formula Column |
| 8 | Baker | John | Boulder | 111-22-3333 | 111223333 |
| 9 | Cooper | Sandra | Boulder | 222-33-4444 | |
| 10 | Jones | Miles | Millinocket | 333-44-5555 | |
| 11 | Parker | Amy | Dahlonega | 444-55-6666 | |
| 12 | Smith | Peter | Chicago | 555-66-7777 | |
| 13 | Carter | Crissy | SFO | 666-77-8888 | |

Fig. 11B: A lexicon generated from a portion of the example data set

{B8: Baker}
{C8: John}
{D8: Boulder}
{E8: 111-22-3333}
{LOWER(B8): baker}
{UPPER(B8): BAKER}
{LOWER(C8): john}
{UPPER(C8): JOHN}
{LOWER(D8): boulder}
{UPPER(D8): BOULDER}
{LIST.GET(SPLIT(E8,"\-"),1): 111}
{LIST.GET(SPLIT(E8,"\-"),2): 22}
{LET(X,SPLIT(E8,"\-"),LIST.GET(X,LIST.SIZE(X))): 3333}

Fig 11C: Evaluation formula generated from the lexicon using the squish process

{REGEXREPLACE(E8,"\-","")}

FIG. 11D: The example data set with formula column auto-filled based on the generated evaluation formula

| | B | C | D | E | F |
|---|---|---|---|---|---|
| | Text Field 1 | Text Field 2 | Text Field 3 | Text Field 4 | Formula Column |
| 8 | Baker | John | Boulder | 111-22-3333 | 111223333 |
| 9 | Cooper | Sandra | Boulder | 222-33-4444 | 222334444 |
| 10 | Jones | Miles | Millinocket | 333-44-5555 | 333445555 |
| 11 | Parker | Amy | Dahlonega | 444-55-6666 | 444556666 |
| 12 | Smith | Peter | Chicago | 555-66-7777 | 555667777 |
| 13 | Carter | Crissy | SFO | 666-77-8888 | 666778888 |

1300

FIG. 13A: An example paste-to data set with a selected paste-to formula cell

|   | B | C | D | E | F | G |
|---|---|---|---|---|---|---|
|   | Text Field 1 | Text Field 2 | Text Field 3 | Text Field 4 | Formula 1 | Formula 2 |
| 8 | Baker | John | Boulder | 111-22-3333 | 111223333 |   |
| 9 | Cooper | Sandra | Boulder | 222-33-4444 | 222334444 |   |
| 10 | Jones | Miles | Millinocket | 333-44-5555 | 333445555 |   |
| 11 | Parker | Amy | Dahlonega | 444-55-6666 | 444556666 |   |
| 12 | Smith | Peter | Chicago | 555-66-7777 | 555667777 |   |
| 13 | Carter | Crissy | SFO | 666-77-8888 | 666778888 |   |

1302

1320

FIG. 13B: An example copy-from data set with a selected copy-from value

|   | B | C | D |
|---|---|---|---|
|   | Text Field A | Text Field B | Text Field C |
| 16 | 111223333 |   | qualified |
| 17 | 666778888 |   | qualified |
| 18 | 222334444 | 1 | rehire |
| 19 | 555667777 | 1 | rehire |
| 20 | 333445555 | 0 | retired |
| 21 | 444556666 | 2 | pay benefits |

1322

1340

FIG. 13C: The example paste-to data set auto-filled based on a generated smart lookup formula

|   | B | C | D | E | F | G |
|---|---|---|---|---|---|---|
|   | Text Field 1 | Text Field 2 | Text Field 3 | Text Field 4 | Formula 1 | Formula 2 |
| 8 | Baker | John | Boulder | 111-22-3333 | 111223333 | qualified |
| 9 | Cooper | Sandra | Boulder | 222-33-4444 | 222334444 | rehire |
| 10 | Jones | Miles | Millinocket | 333-44-5555 | 333445555 | retired |
| 11 | Parker | Amy | Dahlonega | 444-55-6666 | 444556666 | pay benefits |
| 12 | Smith | Peter | Chicago | 555-66-7777 | 555667777 | rehire |
| 13 | Carter | Crissy | SFO | 666-77-8888 | 666778888 | qualified |

COPY-PASTE TRIGGERED FORMULA GENERATION

BACKGROUND OF THE INVENTION

Software, and software systems in the form of cloud-based services, have product features for the user that automatically populate an empty target data field based on data that follows a pattern, based on source data in other data cells, and/or based on formulas (e.g., as typed into a spreadsheet data cell). However, this creates a problem when source data is modified within a database because these auto-populate features do not automatically adjust to the edited data as the systems are only active when initially populating fields.

BRIEF DESCRIPTION OF THE DRAWINGS

Various embodiments of the invention are disclosed in the following detailed description and the accompanying drawings.

FIG. 7A is a block diagram illustrating an example data set.

FIG. 7B is a block diagram illustrating an example code set.

FIG. 8A is a block diagram illustrating an example data set with an example user input string.

FIG. 8B is a block diagram illustrating a portion of an example data set.

FIG. 8C is a block diagram illustrating an example of a first formula vocabulary.

FIG. 8D is a block diagram illustrating an example of a second formula vocabulary.

FIG. 9A is a block diagram illustrating an example of a lexicon.

FIG. 9B is a block diagram illustrating an example of evaluation formulas.

FIG. 10A is a block diagram illustrating a portion of a second example data set with a second example user input string.

FIG. 10B is a block diagram illustrating an example of a first formula vocabulary.

FIG. 10C is a block diagram illustrating an example of a second formula vocabulary.

FIG. 10D is a block diagram illustrating an example of a lexicon.

FIG. 10E is a block diagram illustrating an example of evaluation formulas.

FIG. 11A is a block diagram illustrating an example data set with another example user input string.

FIG. 11B is a block diagram illustrating an example of a lexicon.

FIG. 11C is a block diagram illustrating an example of an evaluation formula.

FIG. 11D is a block diagram illustrating an example data set with an auto-filled formula column.

FIG. 13A is a block diagram illustrating an example paste-to data set.

FIG. 13B is a block diagram illustrating an example copy-from data set.

FIG. 13C is a block diagram illustrating an example paste-to data set with an auto-filled formula column.

DETAILED DESCRIPTION

Figure 1:
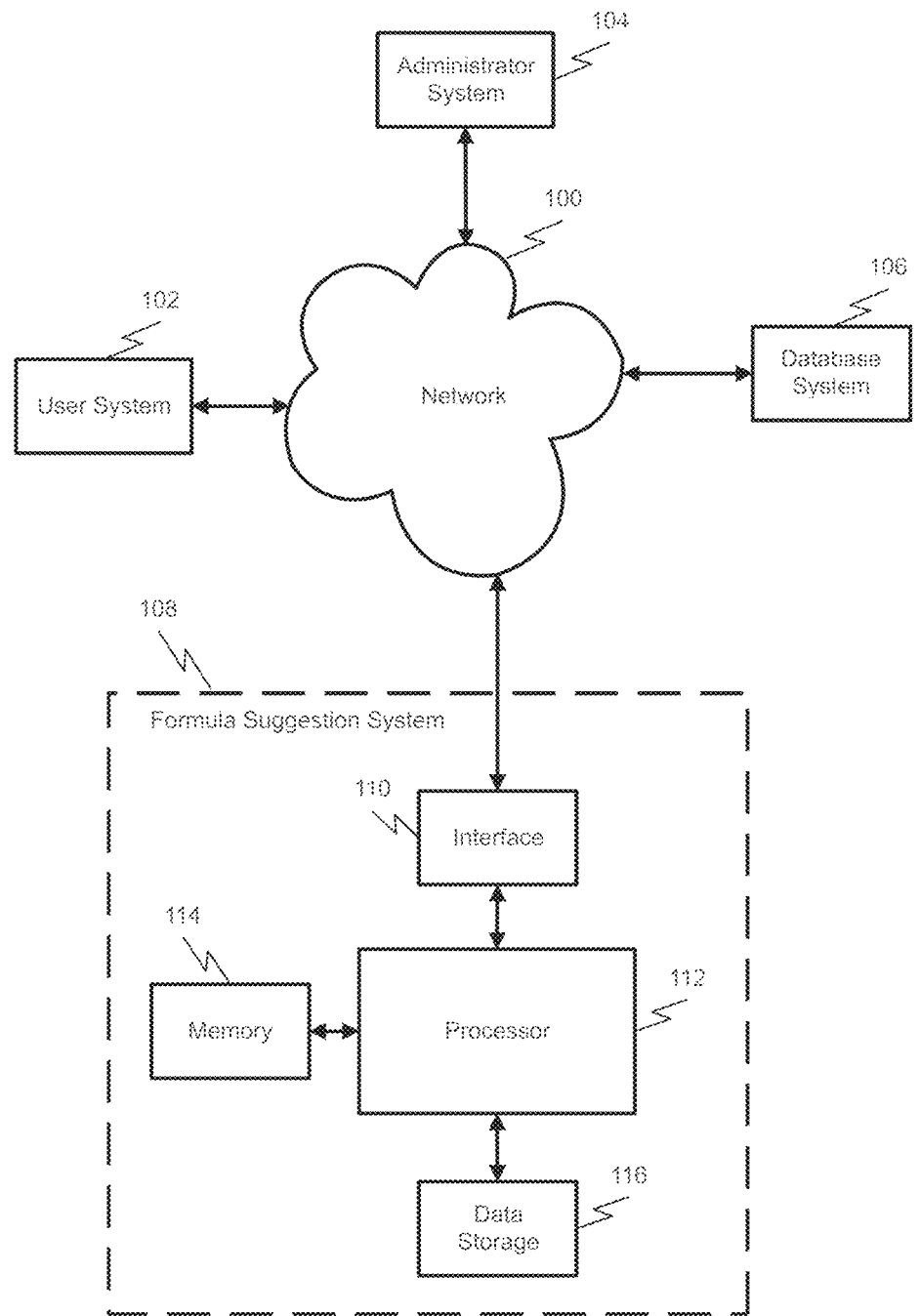
FIG. 1 is a block diagram illustrating an embodiment of a system for providing formula suggestions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for generating formula suggestions by example is disclosed. The system comprises an interface, a processor, and a memory. The interface is configured to receive a user input string for a data cell. The processor is configured to determine a lexicon from data related to the data cell; determine an efficient formula from the lexicon; and provide the efficient formula to a formula cell. The memory is coupled to the processor and configured to provide the processor with instructions.

Software, and software systems provided as cloud-based services are often provided with product features for the user that automatically populate an empty target data. However, when source data is modified, these auto-populate features do not automatically adjust to the edited data. The system improves the computer system by providing adaptive 'smart' formulas and/or efficient formula suggestions that are generated by example to the user. The user experience is more efficient and the user interface includes a novel feature enabling automatic formula generation and/or selection. The system further improves the computer system by reducing processing time to initially populate and/or update data cells associated with values as it reduces interaction time and the requirement for handling each data cell in a formula area (e.g., a formula column) separately.

Database analysts often spend the majority of their time 'data wrangling'—transforming and mapping data from one raw data form into another format with the intent of making it more appropriate and valuable for a variety of downstream purposes such as analytics (e.g., analytics useful in finance, human resource, and planning systems). However, many data analysts are either non-programmers, or have limited programming skills, and rely instead on the software tools that are made available to them. Programming by example (PBE) can empower these users to more effectively leverage existing software systems by generating programming code (e.g., in the form of small scripts or formulas) to manipulate source data (e.g., raw data in need of editing or analysis) through the use of examples. However, while many PBE tools (e.g., FlashFill, FlashExtract, FlashRelate, etc.) provide the end result to the user (i.e., the calculated value of the programming code) to populate areas of a database, the codes themselves are hidden from the user. Additionally, when source data is modified within a database, these areas that have been populated using the PBE tools do not automatically adjust to modified source data, requiring additional resources to monitor, edit, or otherwise maintain.

The disclosed system improves PBE by providing a formula suggestion that is generated by example to the user (e.g., within a spreadsheet data cell) that, when accepted, propagates to each target data cell in a user-selected region of interest (e.g., a formula column). As source data linked to each target data cell is added or removed, the accepted formula recalculates a new target data cell value based on the new source data value, thereby providing an adaptive or 'smart' method of accommodating changes to the source database. Additionally, presenting formula suggestions that are generated by example to the end-user (i.e., no longer hiding the code and presenting only the calculated value when initially populating data cells) provides the user an opportunity to learn how to customize and create efficient formulas for their own use as well as correct any errors in the formulas.

In some embodiments, the system allows the insertion of reports into a workbook sheets as report areas, and these report areas have rows of related data and the ability to also have formula columns in these report areas. The point of this feature was to generate a formula that would produce a value that was entered either directly or via a copy-paste operation into a report area formula column cell by a user. The formula generator would use data from other cells in the associated report area (e.g., in the same row) on which the value entered to generate an appropriate formula and then that generated formula would be applied to all of the cells in that report area formula column. Additionally, in some cases, in the event that the value entered into the report formula column cell was from a copy-paste operation from a report area cell, the generated formula is included in an appropriate lookup formula from that source report area as well using values from the cells on the row in the report area from which the value was copied and from the report area row into which the value is being pasted to determine how best to match the rows between the two report areas. In some embodiments, this makes populating areas associated with reports easier and more intuitive for a user.

In some embodiments, the formula generation occurs anywhere spreadsheet functionality is desirable—for example, in data tables embedded in applications for presentations, in documents (e.g., a Word document, a Portable Document Format (PDF) document, a dashboard-style document, etc.), in communications, etc.

The formula suggestion system that is generated by example receives input data from a user (e.g., an example that is entered via a network) working with a spreadsheet of data (e.g., to analyze data, prepare a report, reformat the data, etc.). The input data comprises a 'user input string', wherein the user input string comprises a specific value (i.e., a specific set of characters) that the user would like to generate from a portion or region of the spreadsheet data. For example, given a portion of a dataset comprising employee names, wherein the first and last employee names are listed in separate data columns, the user input string comprises a value that joins the first and last names together in a new single column. The user input string is typed by the user into a data cell of the new column, wherein the user input string is arranged in the desired format. For example, it may be desired to join the first name John and the last name Baker simply as 'John Baker' into a single data cell, or as 'Baker, John', 'J. Baker', 'JBaker', 'johnb', or joined in any desired format.

In another example, the desired user input string adds new characters to the joined names. For example, a company may have standard format for creating employee email addresses that uses first initial and employee last name combined to preface the string '@email.com'. In this example, the user input string might be 'jbaker@email.com'.

In either example above, the user input string is transmitted to the formula suggestion system wherein the formula suggestion program searches through a portion of the user data set to find the data cells, or portions of data cells, that match the desired input string. For example, in response to typing 'jbaker@email.com', the program finds a data cell in the data set comprising 'John' and reformats or transforms proper case 'John' into lower case 'john' using a transform function (e.g., a formula written in computer code or scripting language available to the spreadsheet application). Using another formula, the program parses the first character of 'john' to provide a first portion of the user input string (i.e., the character 'j'). The user input string is next truncated by the formula suggestion program by removing the found matching character 'j' to create the truncated user input string 'baker@email.com'. The program then looks for data cells in the data set that match a portion of the truncated user input string and finds that a transformed version of 'Baker' (i.e., 'baker') exactly matches the first five characters of the truncated user input string. The formulas that provide each of the found portions of the user string are joined (i.e., concatenated) to create an evaluation formula that generates 'jbaker'. The evaluation formula is tested to see whether its output fully matches the user input string 'jbaker@email.com'. Since it does not, a new truncated user input string is generated as '@email.com' but no data cells in the portion of the data set are found to match a portion of the new truncated user input string. In this instance, the program adds the literal character '@' to the previous concatenated formulas to generate the next evaluation formula "jbaker@". Again, the next evaluation formula does not fully match the user input string, so the process continues literal character at a time until finally an evaluation formula is generated that produces the output 'jbaker@email.com'. The successful evaluation formula is then returned to the user—for example, into the same data cell wherein the user typed 'jbaker@email.com'. Since this is now a formula that generates the user input string from a portion of the user's data set, rather than just the characters of the user input string, it can be used to perform the same operation for other source data (i.e., source data comprising other employee first and last names). The program is thus enabled to automatically propagate the successful evaluation formula to empty data cells in the data set associated with the input data cell, adjusted to refer to the relevant source data cells (e.g., source data in the row below the row used to generate the successful evaluation formula), and thus return a completed data set comprising all employee names in the user data set converted to their associated email addresses.

In some embodiments, one or more evaluation formulas are found to be successful at providing the user input string, and those choices are presented to the user to select one. This provides the user an opportunity to both study and learn from the various formula or scripting details provided, as well as confirm the most appropriate choice of formula to suit their needs. In some embodiments, the formula suggestion system determines which evaluation formulas from one or more successful formulas provide the most efficient solution—for example, by using a scoring system to rank the one or more successful formulas based on a desired criterion. In some embodiments, the scoring system is developed heuristically, for example, based on experience with a user's data application, types of analyses, formatting standards, etc. For example, evaluation formulas generated from empty data cells, data cells that comprise a formula that returns a zero, data cells that contain a single dash, data cells that contain an error value, etc., are scored less likely to provide a successful match compared to evaluation formulas generated from non-empty data cells, from data cell values that are longer than one or more characters, from data cells that have been labeled intentionally to act as a reference key (e.g., a key that uniquely identifies a specific data cell, data set, row, or column within a data set), etc.

In some embodiments, the formula suggestion program provides a smart copy and paste process that creates an efficient formula to copy data from one data set and paste into another data set by linking the two data sets through the use of reference keys. For example, a smart lookup formula that matches an employee identification number in a first data set to the same employee identification number in a second data set and uses the employee identification number to provide data related to the employee identification number data in the second data set that does not yet exist in the first date set. In some embodiments, the smart lookup formula relies on finding an exact reference key match that exists in both data sets. In some embodiments, the smart lookup formula uses other elemental formulas (e.g., transforms, parsing functions, etc.) to find a value in the first data set that, when acted upon by the elemental formula, exactly matches the reference key in the second data set. In some embodiments, wherein one or more evaluation formulas are found to be successful at providing the user input string, the formula suggestion program provides the smart lookup formula using a scoring system to determine which of the one or more successful evaluation formulas to provide. In some embodiments, the formula suggestion program provides the user with a choice of one or more successful evaluation formulas to select.

The smart copy system improves the computer by providing adaptive 'smart' formulas and/or efficient formula suggestions to the user. The user experience is more efficient and the user interface includes a novel feature enabling automatic formula generation and/or selection. The system further improves the computer system by reducing processing time to initially populate and/or update data cells associated with values as it reduces interaction time and the requirement for handling each data cell in a formula area (e.g., a formula column) separately.

FIG. 1 is a block diagram illustrating an embodiment of a system for providing formula suggestions. In the example shown, formula suggestion system 108 is connected to a user using user system 102 via network 100. Network 100 also connects administrator system 104 and database system 106 to formula suggestion system 108. In some embodiments, network 100 comprises a communication network. In various embodiments, network 100 comprises wired and/or wireless communication networks comprising standard, hybrid, and/or proprietary networks (e.g., a local area network, a wide area network, a virtual private network, etc.), proxy servers, and data centers. In some embodiments, network 100 comprises a content distribution network.

In various embodiments, network 100, user system 102, administrator system 104, database system 106, and/or formula suggestion system 108 comprise components of a cloud computing platform—for example, comprising a front-end platform (e.g., a fat client, a thin client, etc.), a back-end platform (e.g., servers, data storage, etc.), a cloud-based delivery system, and a network (e.g., Internet, an intranet, an intercloud, etc.).

In some embodiments, administrator system 104 is used by an administrator administrating formula suggestion system 108—for example, monitoring performance, providing software maintenance, handling bugs, crashes, or other system issues, etc. In some embodiments, monitoring output from formula suggestion system 108 is provided to administrator system 104 and/or user system 102 via network 100. In various embodiments, monitoring output comprises system status (e.g., availability, resource usage, etc.), changes to a program version or code set, error messages, and/or use logs (e.g., the number of accepted or unaccepted formula suggestions; dates and times of usage; processing times; transmission speeds; error generation/resolution; etc.).

In the example shown, formula suggestion system 108 comprises interface 110, processor 112, memory 114, and data storage 116. In various embodiments, a user (e.g., a data analyst) selects a data set (e.g., from a spreadsheet in database system 106) and inputs a user input string (e.g., via user system 102) into a data cell of the data set (e.g., a formula cell within the data set). In some embodiments, the user input string is transmitted via network 100 and interface 110 and is processed using processor 112 (e.g., to generate a formula suggestion). In various embodiments, a computer program, a code set (e.g., a code set comprising transform functions, parsing formulas, and delimiters), formula vocabularies (e.g., a first formula vocabulary, a second formula vocabulary, and/or a lexicon), substring values, longest values, evaluation formulas, and/or formula suggestions (e.g., comprising an efficient formula) are stored (e.g., temporarily, long term, short term, etc.) in memory 114 (e.g., an integrated circuit memory) for use by processor 112, and/or stored in data storage 116 (e.g., a hard drive, an integrated circuit storage device, etc.) for later retrieval (e.g., the computer program, the code set, etc.).

In some embodiments, in response to a user input string, formula suggestion system 108 provides a suggested formula that, when executed, provides the value of the user input string when applied to a data value within a data set selected by the user. In some embodiments, formula suggestion system 108 provides a suggested formula that copies data from a user-selected portion of a data set and pastes the suggested formula into a target cell (e.g., a data cell within a formula column). In some embodiments, formula suggestions are based on determining key values (e.g., key values within a user-selected portion of a data set that are associated with a user-selected data cell). In some embodiments, the suggested formula automatically propagates into a user-selected portion of the data set (e.g., a column, a row, an area of a spreadsheet) associated with the data cell receiving the user input string.

In some embodiments, determining a formula suggestion comprises receiving a user input string for a data cell (e.g., a data cell from a data set arranged in rows and columns). In some embodiments, the data cell is in a formula column (e.g., a column comprising the data cell). In some embodiments, determining a formula suggestion comprises determining a lexicon from data related to the data cell (e.g., the codes and values of data related to the data cell that has also been transformed and parsed).

In some embodiments, the data is related to the data cell by being located in data cells in a same row of the data cell. In some embodiments, the data is related to the data cell by being located in data cells in a same row and located left of the data cell. In some embodiments, the data is related to the data cell by being located in data cells in a report region associated with the data cell (e.g., a user-defined report region, a template-determined report region, a report region from another file, database, workbook, worksheet, or any other appropriate report region or source).

In some embodiments, determining a formula suggestion comprises determining an efficient formula from the lexicon. In some embodiments, the efficient formula is provided to a formula cell (e.g., to the formula cell comprising the user input string, a formula cell adjacent to the cell the user input string was entered into, an other formula cell not adjacent to the cell the user input string was entered into, etc.). In some embodiments, the user is provided a selection of possible formulas and the user is able to indicate a selection of a desired formula. In some embodiments, a processor (e.g., processor 112) is configured to indicate displaying the efficient formula (e.g., in the native or embedded spreadsheet code). In some embodiments, the processor is further configured to fill data cells in a column of the data cell (e.g., the formula column). In some embodiments, determining the efficient formula comprises using a scoring system (e.g., when formula suggestion system 108 generates more than one formula suggestion that can provide the value of the user input string when applied to a data value within a data set selected by the user).

In some embodiments, the efficient formula uses a lexicon generated from a data in a cell close to the data cell (e.g., from a data cell in a row to the left or right of the data cell that is close to the data cell, from a data cell in a column above or below the data cell that is close to the data cell, etc.). In some embodiments, the efficient formula is in spreadsheet language—for example, Visual Basic for Applications (VBA). In some embodiments, the efficient formula is in a database language—for example, Structured Query Language (SQL). In some embodiments, the efficient formula uses one or more literal values (e.g., a character literal representing a fixed value).

In some embodiments, determining the efficient formula comprises determining one or more substrings (e.g., from data values within a lexicon). In some embodiments, determining the one or more substrings comprises generating substrings from data values that match a portion of the user input string. In some embodiments, determining the substrings comprises generating all substrings of the data value that match a portion of the user input string and begin with the first character of the portion of the user input string that is matched. For example, given a user input string of 'baker@email.com', and 'baker' (e.g., generated from a data value in the lexicon) was found to match a portion of the user input string, the substrings of 'baker' that begin with the first character of the portion of the user input string that is matched comprise: {baker, bake, bak, ba, b}. In some embodiments, determining the efficient formula comprises determining a substring of the user input string not matched (i.e., determining the remainder of a user input string that has been partially matched while generating the efficient formula). For example, given a user input string of 'jbaker@email.com', and a partial match of 'jbaker' (e.g., wherein the 'j' of 'jbaker' was generated from a substring of 'john' and 'baker' was generated from a data value in the lexicon), the 'user input string not matched' in this example would be '@email.com'. In some embodiments, determining the efficient formula comprises determining a longest substring of the data related to the data cell that matches a substring of the user input string. For example, a substring comprising the entire data that matches a given substring of the user input string would be the longest possible substring, a substring comprising the entire data less one character would be the second longest possible substring, etc. In some embodiments, a remainder value is generated from the longest substring by removing the characters that match a given substring of the user input string. In some embodiments, the remainder value is appended to the lexicon.

In some embodiments, determining a lexicon comprises determining a first and second vocabulary. In some embodiments, the lexicon comprises the first and second vocabularies. In some embodiments, determining a first formula vocabulary comprises determining an address and a value of each data cell within the data related to the data cell. In some embodiments, determining a second formula vocabulary comprises determining transformed values of the values within the first vocabulary (e.g., lower, upper, and/or proper versions of the values within the first vocabulary). In some embodiments, the second formula vocabulary comprises the first vocabulary.

In some embodiments, the lexicon comprises one or more codes used to generate the data related to the data cell, a transformed data set, and/or a parsed data set. In some embodiments, determining the lexicon comprises lower, upper, and/or proper versions of a value of the data related to the data cell (e.g., 'data cell', 'DATA CELL' and 'Data cell'). In some embodiments, determining the lexicon comprises a split value, a first value, a second value, and/or a last value. In some embodiments, the split value, first value, the second value, and/or the last value are determined by parsing the data related to the data cell using one or more delimiters. For example, given a user input string comprising '111-222-333-444', the split values based on the dash delimiter comprise the set {111, 222, 333, 444}. The first value of the example set of split values is 111; the second value is 222; and the last value is 444. In some embodiments, determining the efficient formula comprises generating 'squish' values, wherein a squish value comprises a value where one or more delimiters, or combinations of delimiters, have been removed. For example, given a user input string comprising '111-222-333-444', the squish value would be '111222333444'. If a value does not contain any delimiters, its squish value would be identity. For example, given a user input string comprising '111222333444', its squish value would be '111222333444'. In some embodiments, determining the efficient formula comprises determining a longest 'squish' value.

In some embodiments, determining the efficient formula comprises determining the longest value from the following: (i) the longest value of the lexicon that exactly matches a substring of the user input string, (ii) the longest substring generated from the lexicon that matches a substring of the user input string, or (iii) the longest squish value generated from the lexicon that matches a substring of the user input string.

In some embodiments, determining the efficient formula comprises determining one or more evaluation formulas, wherein an evaluation formula is used in determining which formula is selected as being complete and efficient (i.e., 'complete' in that the evaluated formula is able to generate the entire user input string, and 'efficient' in that the evaluated formula is heuristically scored as more efficient than other formulas, if any, that can also generate the entire user input string). An evaluation formula is composed of the code that generated the longest value, literal characters (e.g., where no match is made to a truncated user input string), and/or the previous evaluation formula. A truncated user input string is a substring of the user input string where one or more characters have been truncated starting from the first character of the user input string that matches the output of a previous evaluation formula. For example, given a user input string of 'jbaker@email.com', and a previous evaluation formula that generated 'jbaker' from the lexicon, the truncated user input string in this example would be '@email.com'.

In various embodiments, the delimiter comprises one or more of: a period '.', a space ' ', a comma ',', a semicolon ';', a colon an underscore '_', a dash '-', a parentheses '(or)', a bracket, a square bracket '[ or]', a curly bracket '{ or}', a question mark '?', an exclamation point '!', a forward slash '/', a vertical slash '|', a backward slash '\', a hashtag sign '#', a dollar sign '$', a percent sign '%', an ampersand '&', a math symbol, a plus sign '+', an equal sign '=', a greater than sign '>', a less than sign '<', a greater than or equal to sign '>', and a less than or equal to sign '<', comma-space ',', or any other appropriate delimiter.

Figure 2:
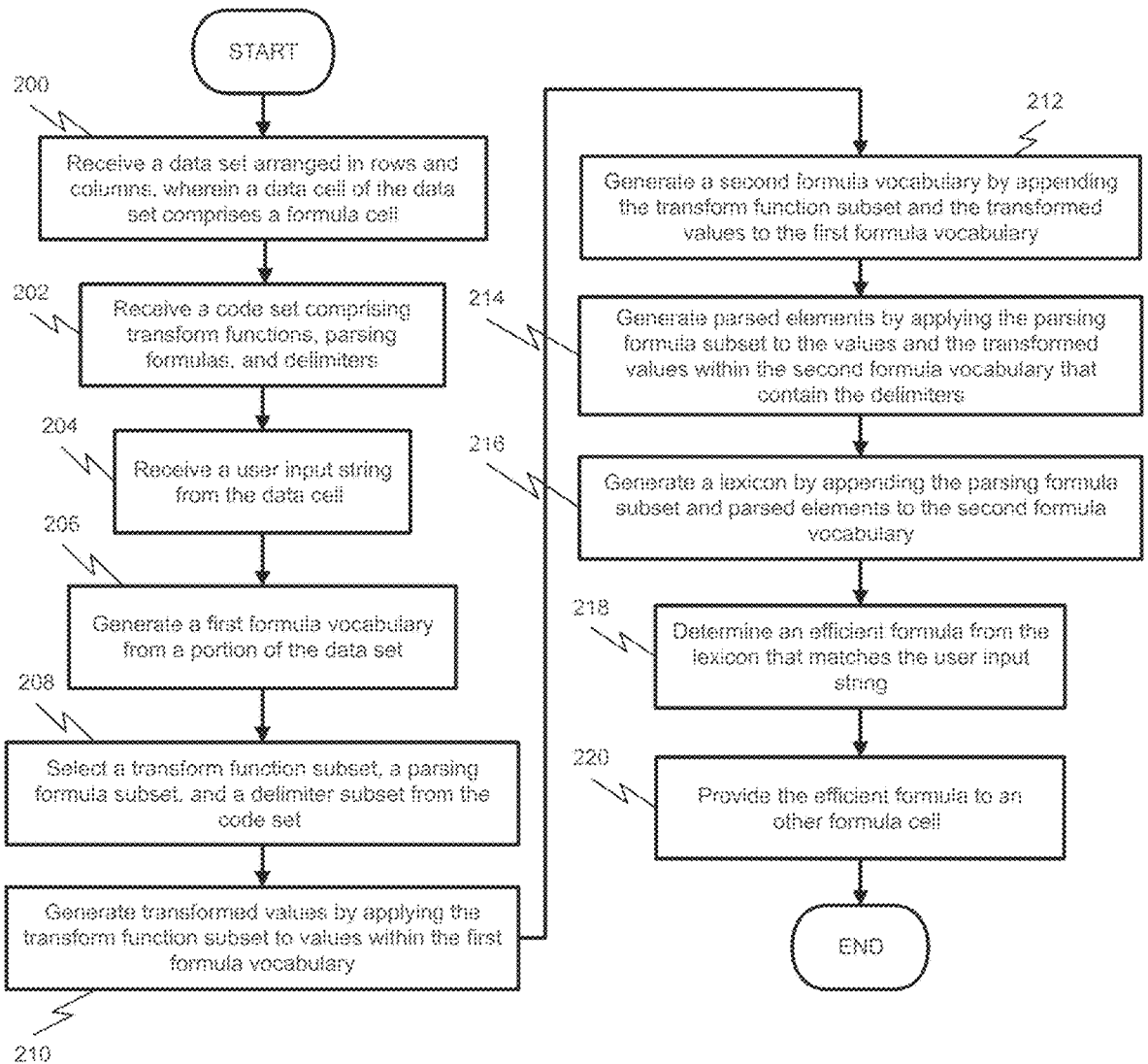
FIG. 2 is a flow diagram illustrating an embodiment of a process for providing an efficient formula.

FIG. 2 is a flow diagram illustrating an embodiment of a process for providing an efficient formula. In some embodiments, the process of FIG. 2 is executed using the processor of formula suggestion system 108 of FIG. 1. In various embodiments, the process of FIG. 2 is executed in whole or in part using any appropriate combination of one or more processors.

In 200, a data set arranged in rows and columns is received, wherein a data cell of the data set comprises a formula cell. For example, a data set from a spreadsheet application arranged in rows and columns is received. In some embodiments, the formula cell comprises a data cell in a spreadsheet that is designated as a formula cell with a formula associated with it and in some cases where the formula cell is associated with a group of other formula cells (e.g., a column, a row, an area of the spreadsheet). In various embodiments, a spreadsheet application comprises Workday Worksheets, Microsoft Excel, Apple Numbers, Google Sheets, Quip, EtherCalc, Zoho Sheets, LibreOffice, Apache OpenOffice Calc, Smartsheet, Airtable, or any other appropriate spreadsheet. In some embodiments, the data cell does not comprise a formula cell. In some embodiments, the input data received in the data cell is designated as the input without the cell being designated as a formula cell. In some embodiments, the data cell that the input is received in is not in the data set but in a separate designated location.

In 202, a code set comprising transform functions, parsing formulas, and delimiters is received. For example, a computer programming code set comprising one or more transform and parsing instructions, and one or more delimiters, is received. The transform instructions transform or convert character case (e.g., into uppercase, lowercase, or proper case) and the parsing instructions parse or split strings of data into substrings or parse the data into elements separated by one or more delimiters, wherein a string comprises characters (e.g., letters, words, phrases, or symbols) and a substring comprises one or more characters, inclusive of the entire string. In some embodiments, the code set comprises the entirety of the computer programming code associated with the spreadsheet application. In various embodiments, the code set comprises custom code, formulas, or scripts that are understood by the spreadsheet application (e.g., Visual Basic for Applications is used by Microsoft Excel to create custom code, formulas, or scripts). In various embodiments, the code set comprises programming code not native to the spreadsheet application, but which can process file structures used by the spreadsheet application—for example, Java, Python, Structured Query Language (SQL), Structured Process Language (SPL), etc.

In 204, a user input string is received from the data cell. For example, a user types a data string into a data cell, wherein the data cell comprises a formula cell. In some embodiments, the user input string is related to a form of the data within the data set not given. For example, given a data set comprising the single value 'Ronnie Anderson, UK', the user input string 'RAnderson' is not given. In 206, a first formula vocabulary is generated from a portion of the data set. For example, a first formula vocabulary comprising a first list of data cell addresses and associated values is generated from a portion of the data set (e.g., a portion of the data set to the left of the user input string—so, for example, the vocabulary is a list of the contents of each data cell to the left of the user input string in a designated area).

In 208, a transform function subset, a parsing formula subset, and a delimiter subset are selected from the code set. For example, one or more transform functions, parsing formulas, and delimiters are selected from the code set, inclusive of the entire code set. In some embodiments, the selection of transform functions, parsing formulas, and delimiters is determined heuristically. In various embodiments, the selection of transform functions, parsing formulas, and delimiters is determined via machine learning or artificial intelligence programs. In some embodiments, the transform functions comprise a function to transform the string in a data cell to all lower case, to all upper case, and to first letter upper case and the rest lower case (i.e., 'proper' case). In 210, transformed values are generated by applying the transform function subset to values within the first formula vocabulary. For example, a second list is generated from the portion of the data set associated with the user input string, wherein the second list comprises each transform function of the transform function subset, and its respective transformed value. In some embodiments, the second list comprises each transform function of the transform function subset, and its respective transformed value, not present in the first formula vocabulary.

In 212, a second formula vocabulary is generated by appending the transform function subset and the transformed values to the first formula vocabulary. For example, the second list is appended to the first list of the first formula vocabulary. In some embodiments, only the transform functions and associated values of the second list not present in the first formula vocabulary are added to the second formula vocabulary.

In 214, parsing elements are generated by applying the parsing formula subset to the values and the transformed values within the second formula vocabulary that contain the delimiters. For example, a third list is generated from the second list, wherein the third list comprises each parsing formula of the parsing formula subset, and its respective parsed value. In some embodiments, the third list comprises each parsing formula of the parsing formula subset, and its respective parsed value, not present in the second formula vocabulary. In some embodiments, the parsing formula removes one or more delimiters in the string in a data cell (e.g., removing all dashes, periods, and/or commas, etc.)

In 216, a lexicon is generated by appending the parsing formula subset and parsed elements to the second formula vocabulary. For example, the third list is appended to the second list of the second formula vocabulary. In some embodiments, only the parsing formulas and associated parsed values of the third list not present in the second formula vocabulary are added to the lexicon.

In 218, an efficient formula is determined from the lexicon that matches the user input string. For example, an efficient formula is determined from one or more of the following: any element within the lexicon (i.e., any element comprising a formula and its associated value), any squished value and associated squish formula generated from the lexicon, or any substring and associated substring formula generated from the lexicon, or any literal characters comprising the user input string. In some embodiments, the efficient formula is generated from one or more evaluation formulas. In some embodiments, one or more efficient formulas are generated, and the user is presented with a choice of which efficient formula to select. In some embodiments, the efficient formula comprises a formula that when applied to the input data cell(s) generates a desired output (e.g., from columns with first names and last names an email address is generated with the first initial of the first name and the entire last name concatenated with an email server domain—for example, from John Baker an email address of jbaker@email.com is generated). In 220, the efficient formula is provided to an other formula cell, and the process ends. In some embodiments, the other formula cell comprises the data cell into which the user initially provided the input string. In some embodiments, the other formula cell is not the data cell into which the user initially provided the input string. For example, the other formula cell is adjacent to the data cell into which the user initially provided the input string, in a different column from the data cell into which the user initially provided the input string, or any other appropriate formula or data cell. In some embodiments, the generated formula is provided at the end of the process to a designated formula cell or formula column that is not within the data set but in an alternate designated location.

In various embodiments, when the efficient formula is provided to the other formula cell, a computer program is triggered to automatically provide the efficient formula to other formula cells within the data set (e.g., to formula cells associated with the data cell). In some embodiments, the efficient formula is automatically adjusted to refer to source data within the data set that is associated with the other formula cells. For example, when an efficient formula returns the user input string to the other formula cell (e.g., an efficient formula as generated from source data to the left of the other formula cell), the formula cell immediately below the other formula cell is automatically filled in with the efficient formula automatically adjusted to refer to source data to the left of the other formula cell immediately below the other formula cell.

Figure 3:
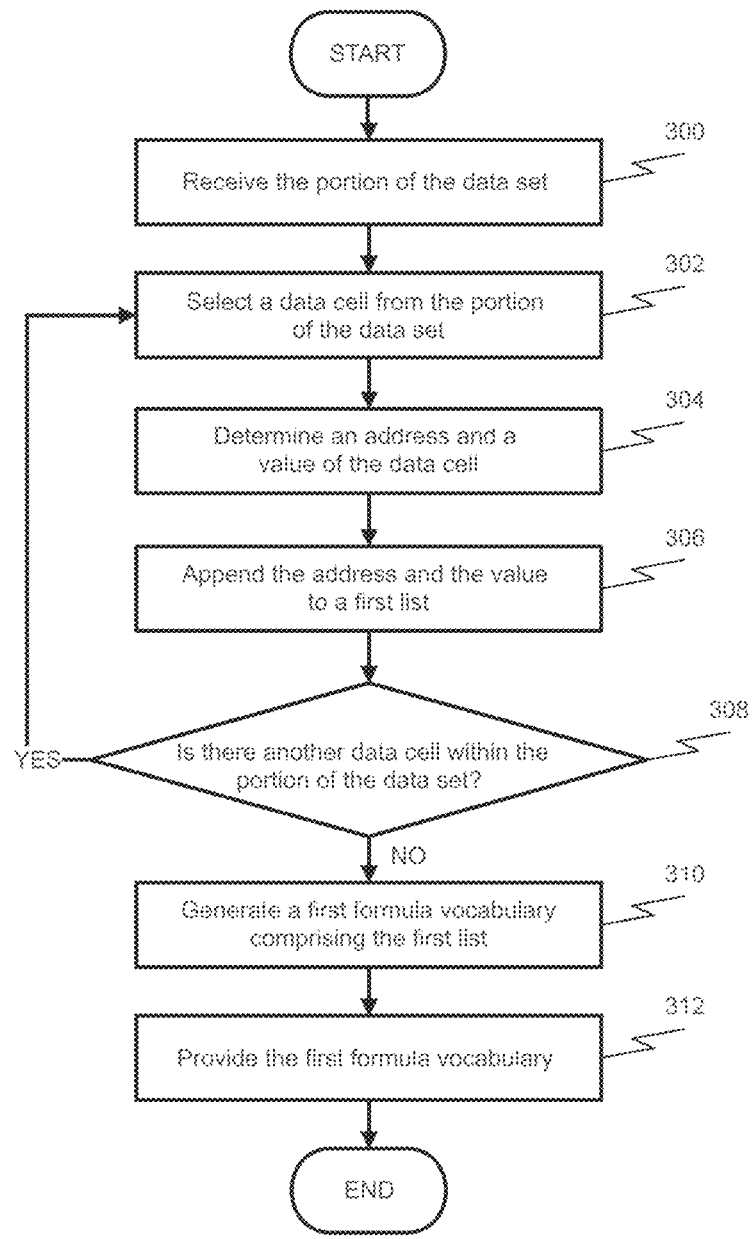
FIG. 3 is a flow diagram illustrating an embodiment of a process for providing a first formula vocabulary.

FIG. 3 is a flow diagram illustrating an embodiment of a process for providing a first formula vocabulary. In some embodiments, the process of FIG. 3 is executed using the processor of formula suggestion system 108 of FIG. 1. In various embodiments, the process of FIG. 3 is executed in whole or in part using any appropriate combination of one or more processors.

In 300, the portion of the data set is received. For example, a portion of the data set in the row to the left of the data cell containing the user input string is received. In various embodiments, the portion of the data set comprises any designated region within a data set that is associated with the data cell.

In 302, a data cell is selected from the portion of the data set. For example, a data cell comprising an address and value is selected from the portion of the data set. In 304, an address and a value of the data cell are determined. For example, given a value 'Baker' that is located in a data cell of a data set where row B intersects column 8, the address and value are determined to be {B8: Baker}. In 306, the address and the value are appended to a first list. For example, {B8: Baker} is appended as a first entry to a first list.

In 308, it is determined whether there is another data cell within the portion of the data set. For example, it is determined whether there is another data cell within the portion of the data set associated with the data cell of the data set that comprises a formula cell. In response to determining that there is another data cell within the portion of the data set, the process flows to 302. For example, given a portion of a data set comprising addresses B8, C8, D8, and E8 with respective values Baker, John, Boulder, and 111-22-333, the address and values are determined as elements {B8: Baker}, {C8: John}, {D8: Boulder}, and {E8: 111-22-3333} and appended to a first list. In some embodiments, the elements appended to a first list are maintained in the order generated. In response to determining that there is not another data cell within the portion of the data set, control passes to 310.

In 310, a first formula vocabulary comprising the first list is generated. For example, a first formula vocabulary comprising {B8: Baker}, {C8: John}, {D8: Boulder}, and {E8: 111-22-3333} is generated. In 312, the first formula vocabulary is provided, and the process ends.

Figure 4:
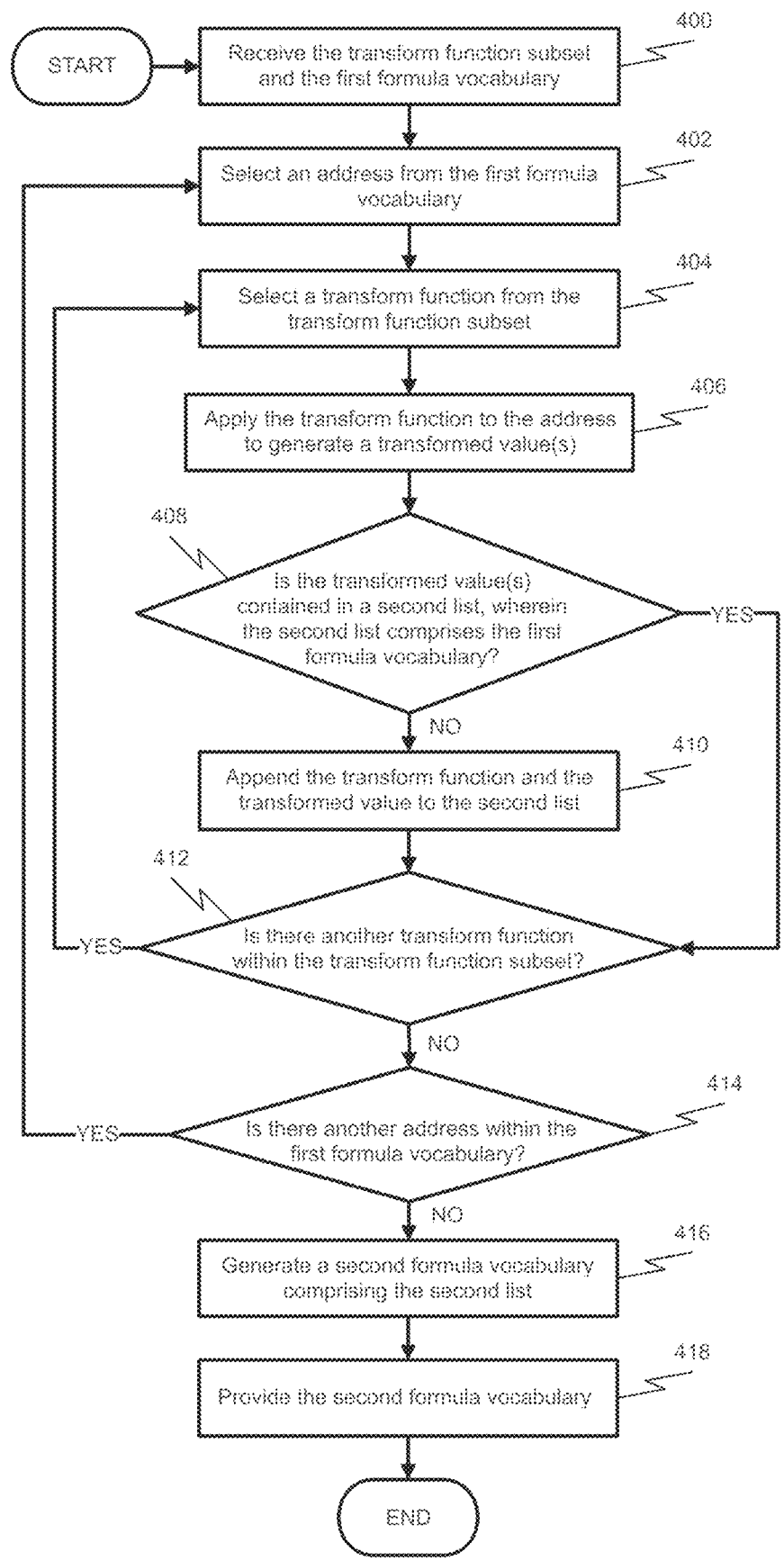
FIG. 4 is a flow diagram illustrating an embodiment of a process for providing a second formula vocabulary.

FIG. 4 is a flow diagram illustrating an embodiment of a process for providing a second formula vocabulary. In some embodiments, the process of FIG. 4 is executed using the processor of formula suggestion system 108 of FIG. 1. In various embodiments, the process of FIG. 4 is executed in whole or in part using any appropriate combination of one or more processors.

In 400, the transform function subset and the first formula vocabulary are received. For example, a transform function subset comprising LOWER(F), UPPER(F), and PROPER(F), and first formula vocabulary {B8: Baker}, {C8: John}, {D8: Boulder}, and {E8: 111-22-3333}, are received, wherein F is a variable comprising a formula (e.g., a formula that generates a value). In some embodiments, a data cell address is a formula that generates the value of the data cell in which it resides. For example, a computer program calling B8 in the example of FIG. 3 would receive the value 'Baker' for further processing.

In 402, an address from the first formula vocabulary is selected. For example, the address B8 is selected from the first formula vocabulary {B8: Baker}, {C8: John}, {D8: Boulder}, and {E8: 111-22-3333}. In 404, a transform function from the transform function subset is selected. For example, LOWER(F) is selected from the transform function subset LOWER(F), UPPER(F), and PROPER(F). In 406, the transform function is applied to the address to generate a transformed value(s). For example, transform function LOWER (F) is applied to address B8 as LOWER (C8) to generate the transformed value 'baker'.

In 408, it is determined whether the transformed values are contained in a second list, wherein the second list comprises the first formula vocabulary. For example, the transformed value 'baker' is not contained in the second list comprising {B8: Baker}, {C8: John}, {D8: Boulder}, and {E8: 111-22-3333}. In response to determining that the transformed values are not contained in a second list, control passes to 410. In response to determining that the transformed values are contained in a second list, wherein the second list comprises the first formula vocabulary, control passes to 412.

In 410, the transform function and the transformed value is appended to the second list. For example, {LOWER(B8): baker} is appended to the second list, wherein the appended second list comprises {B8: Baker}, {C8: John}, {D8: Boulder}, {E8: 111-22-3333}, and {LOWER(B8): baker}. In some embodiments, the elements appended to a second list are maintained in the order generated. In some embodiments, four distinct 'second lists' are generated comprising: (i) each element of the first formula vocabulary, (ii) each LOWER transformed element of the first formula vocabulary, (iii) each UPPER transformed element of the first formula vocabulary, and each PROPER transformed element of the first formula vocabulary. In some embodiments, a single 'second list' is generated comprising the four lists in order.

In 412, it is determined whether there is another transform function within the transform function subset. For example, it is determined that UPPER(F) is also within the transform function subset. In response to determining that there is another transform function within the transform function subset, the process flows to 404. For example, transform function UPPER(F) is applied to address B8 as UPPER(B8) to generate the transformed value 'BAKER'. In response to determining that there is not another transform function within the transform function subset, control passes to 414.

In 414, it is determined whether there is another address within the first formula vocabulary. For example, it is determined that another address C8 is within the first formula vocabulary. In response to determining that there is another address within the first formula vocabulary, the process flows to 402. In response to determining that there is not another address within the first formula vocabulary, control passes to 416.

In 416, a second formula vocabulary comprising the second list is generated. For example, a second formula vocabulary comprising {B8: Baker}, {C8: John}, {D8: Boulder}, {E8: 111-22-3333}, {LOWER(B8): baker}, {UPPER(B8): BAKER}, {LOWER(C8): john}, {UPPER (C8): JOHN}, {LOWER(D8): boulder}, and {UPPER(D8): BOULDER} is generated. In 418, the second formula vocabulary is provided, and the process ends. For example, the second formula vocabulary is provided to the process of FIG. 2, and the process ends.

Figure 5:
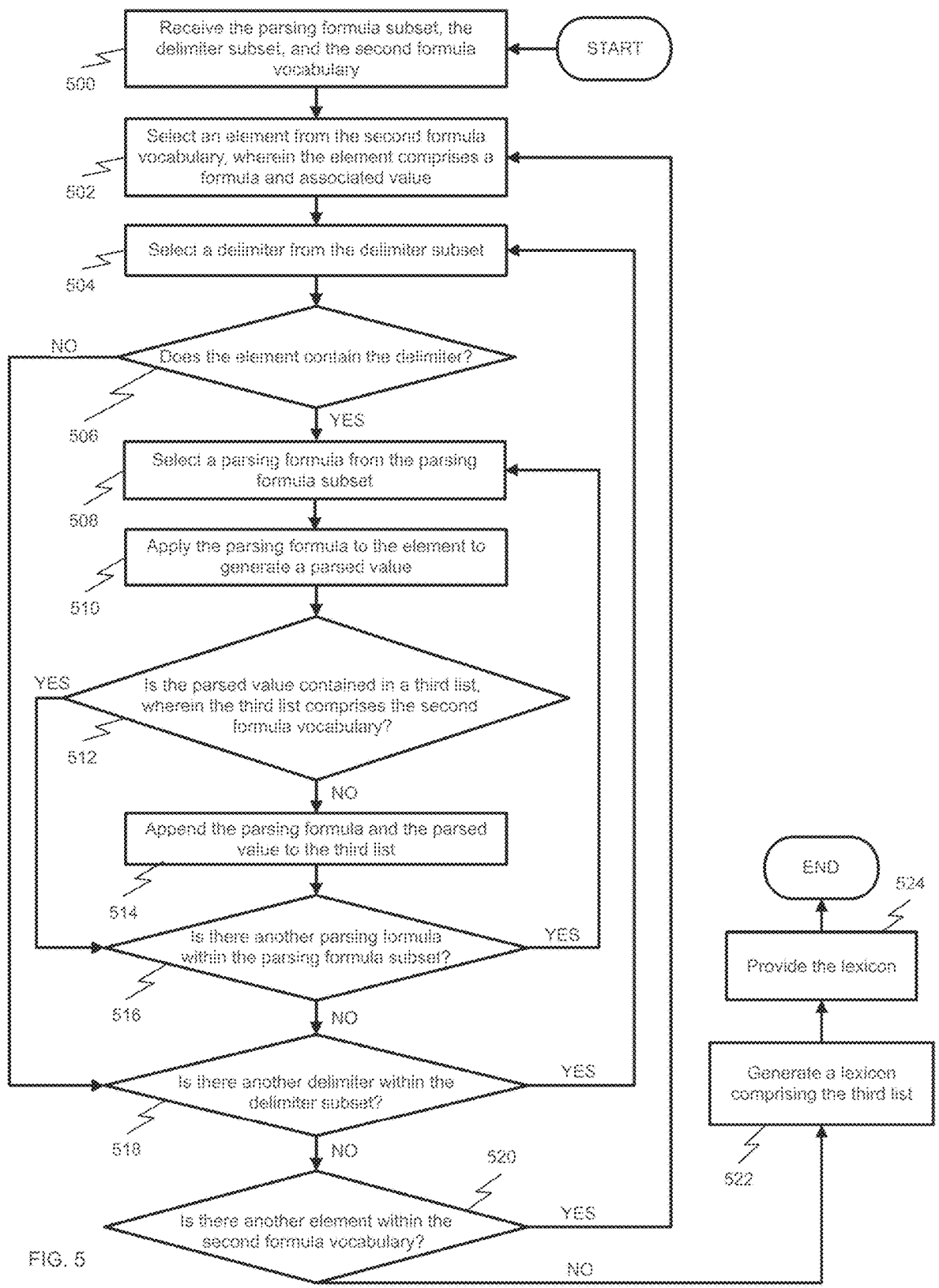
FIG. 5 is a flow diagram illustrating an embodiment of a process for providing a lexicon.

FIG. 5 is a flow diagram illustrating an embodiment of a process for providing a lexicon. In some embodiments, the process of FIG. 5 is executed using the processor of formula suggestion system 108 of FIG. 1. In various embodiments, the process of FIG. 5 is executed in whole or in part using any appropriate combination of one or more processors.

In 500, the parsing formula subset, the delimiter subset, and the second formula vocabulary are received. For example, a parsing formula subset comprising LIST.GET (SPLIT(F,Y),1), LIST.GET(SPLIT(F,Y),2), LET(X, SPLIT (F,Y),LIST.GET(X,LIST. SIZE(X))), and LEFT(F,NUM) is received. In some embodiments, LIST.GET is a function that gets a specified element from a list. For example, a delimiter subset comprising '-', ',', and '.' is received. For example, a second formula vocabulary comprising {B8: Baker}, {C8: John}, {D8: Boulder}, {E8: 111-22-3333}, {LOWER(B8): baker}, {UPPER(B8): BAKER}, {LOWER(C8): john}, {UPPER(C8): JOHN}, {LOWER(D8): boulder}, and {UPPER(D8): BOULDER} is received.

The parsing formula LIST.GET(SPLIT(F,Y),1), given an input F of '111-22-3333' and an input Y of '-', provides 111 as an output—i.e., the '1' of (SPLIT(F,Y),1) indicates to provide the first parsed value of the parsed element set of values provided by SPLIT(FX). Similarly, for the same input, LIST.GET(SPLIT(F,Y),2) provides 22 as the output (i.e., the second parsed value). LET(X,SPLIT(F,Y),LIST-.GET(X,LIST.SIZE(X))) provides the last parsed value of the parsed element set of values, wherein within the LET function, X indicates to use the function SPLIT(F,Y) as the variable X within LIST.GET(X,LIST.SIZE(X)). LIST.SIZE (X) provides the size, or number of parsed values, in X. For the current example, LIST.SIZE(X) returns the value 3 since there are three values in the parsed element set of SPLIT (F,Y) comprising 111, 22, and 3333 (i.e., LIST.SIZE(SPLIT (F,Y))=3). Thus, LIST.GET(X,LIST.SIZE(X)) is, in this example, equal to LIST.GET(SPLIT(F,Y),3) which provides the third, and last, value of the parsed element set of values comprising 111, 22, and 3333 (i.e., LIST.GET(SPLIT(F,Y), 3)=3333). LEFT(F,NUM) provides the number NUM of characters starting from the left of input value F. For example, given an input F of 'john', the formula provides 'j' for an input NUM of '1', 'jo' for an input NUM of '2', etc.

In 502, an element from the second formula vocabulary is selected, wherein the element comprises a formula and associated value. For example, the element {E8: 111-22-3333} is selected from the second formula vocabulary. In 504, a delimiter is selected from the delimiter subset. For example, the delimiter is selected from the delimiter subset.

In 506, it is determined whether the element contains the delimiter. For example, it is determined that the element {E8: 111-22-3333} contains the delimiter '-'. In response to determining that the element contains the delimiter, control passes to 508. In response to determining that the element does not contain the delimiter, control passes to 518. In 508, a parsing formula is selected from the parsing formula subset. For example, the parsing formula LIST.GET(SPLIT (F,Y),1) is selected from the parsing formula subset. In 510, the parsing formula is applied to the element to generate a parsed value. For example, the parsing formula LIST.GET (SPLIT(F,Y),1) is applied to the element {E8: 111-22-3333} as LIST.GET(SPLIT(E8,"\-"),1) to generate the parsed value '111'.

In 512, it is determined whether the parsed value is contained in a third list, wherein the third list comprises the second formula vocabulary. For example, it is determined that the parsed value '111' is not contained in the third list comprising {B8: Baker}, {C8: John}, {D8: Boulder}, {E8: 111-22-3333}, {LOWER(B8): baker}, {UPPER(B8): BAKER}, {LOWER(C8): john}, {UPPER(C8): JOHN}, {LOWER(D8): boulder}, and {UPPER(D8): BOULDER}. In response to determining that the parsed value is contained in a third list, control passes to 516. In response to determining that the parsed value is not contained in a third list, control passes to 514.

In 514, the parsing formula and the parsed value is appended to the third list. For example, {LIST.GET(SPLIT (E8,"\-"),1): 111} is appended to the third list, wherein the appended third list comprises {B8: Baker}, {C8: John}, {D8: Boulder}, {E8: 111-22-3333}, {LOWER(B8): baker}, {UPPER(B8): BAKER}, {LOWER(C8): john}, {UPPER (C8): JOHN}, {LOWER(D8): boulder}, {UPPER(D8): BOULDER}, and {LIST.GET(SPLIT(E8,"\-"),1): 111}.

In 516, it is determined whether there is another parsing formula within the parsing formula subset. For example, it is determined that another parsing formula LIST.GET (SPLIT(F,Y),2) is within the parsing formula subset. In response to determining that there is another parsing formula within the parsing formula subset, the process flows to 508. For example, in 508, LIST.GET(SPLIT(F,Y),2) is selected, and in 510, it is applied to the element {E8: 111-22-3333} as LIST.GET(SPLIT(E8, "\-"),2) to generate the parsed value '22'. In response to determining that there is not another parsing formula within the parsing formula subset, control passes to 518.

In 518, it is determined whether there is another delimiter within the delimiter subset. For example, it is determined that there is another delimiter within the delimiter subset. In response to determining that there is another delimiter within the delimiter subset, the process flows to 504. For example, in 504 the delimiter is selected, and in 506, it is determined that {E8: 111-22-3333} does not contain the delimiter and the process flows to 518 where it is determined that there is another delimiter ',' in the delimiter subset. After looping through the process of 504 through 518 again, it is determined that that there is not another delimiter within the delimiter subset. In response to determining that there is not another delimiter within the delimiter subset, control passes to 520.

In 520, it is determined whether there is another element within the second formula vocabulary. For example, it is determined that there is another element {LOWER(B8): baker} within the second formula vocabulary following {E8: 111-22-3333}. In response to determining that there is another element within the second formula vocabulary, the process flows to 502. For example, in 502 {LOWER(B8): baker} is selected and the process loops from 504 through 520 until all other elements in the second formula vocabulary have been found to not contain and delimiters in the delimiter subset. In response to determining that there is not another element within the second formula vocabulary, control passes to 522.

In 522, a lexicon comprising the third list is generated. For example, a lexicon comprising the third list {B8: Baker}, {C8: John}, {D8: Boulder}, {E8: 111-22-3333}, {LOWER (B8): baker}, {UPPER(B8): BAKER}, {LOWER(C8): john}, {UPPER(C8): JOHN}, {LOWER(D8): boulder}, {UPPER(D8): BOULDER}, {LIST.GET(SPLIT(E8,"\-"), 1): 111}, {LIST.GET(SPLIT(E8,"\-"),2): 22}, and {LET(X, SPLIT(E8,"\-"),LIST.GET(X,LIST.SIZE(X))): 3333} is generated. In 524, the lexicon is provided, and the process ends. For example, the lexicon is provided to the process of FIG. 2, and the process ends.

Figure 6A:
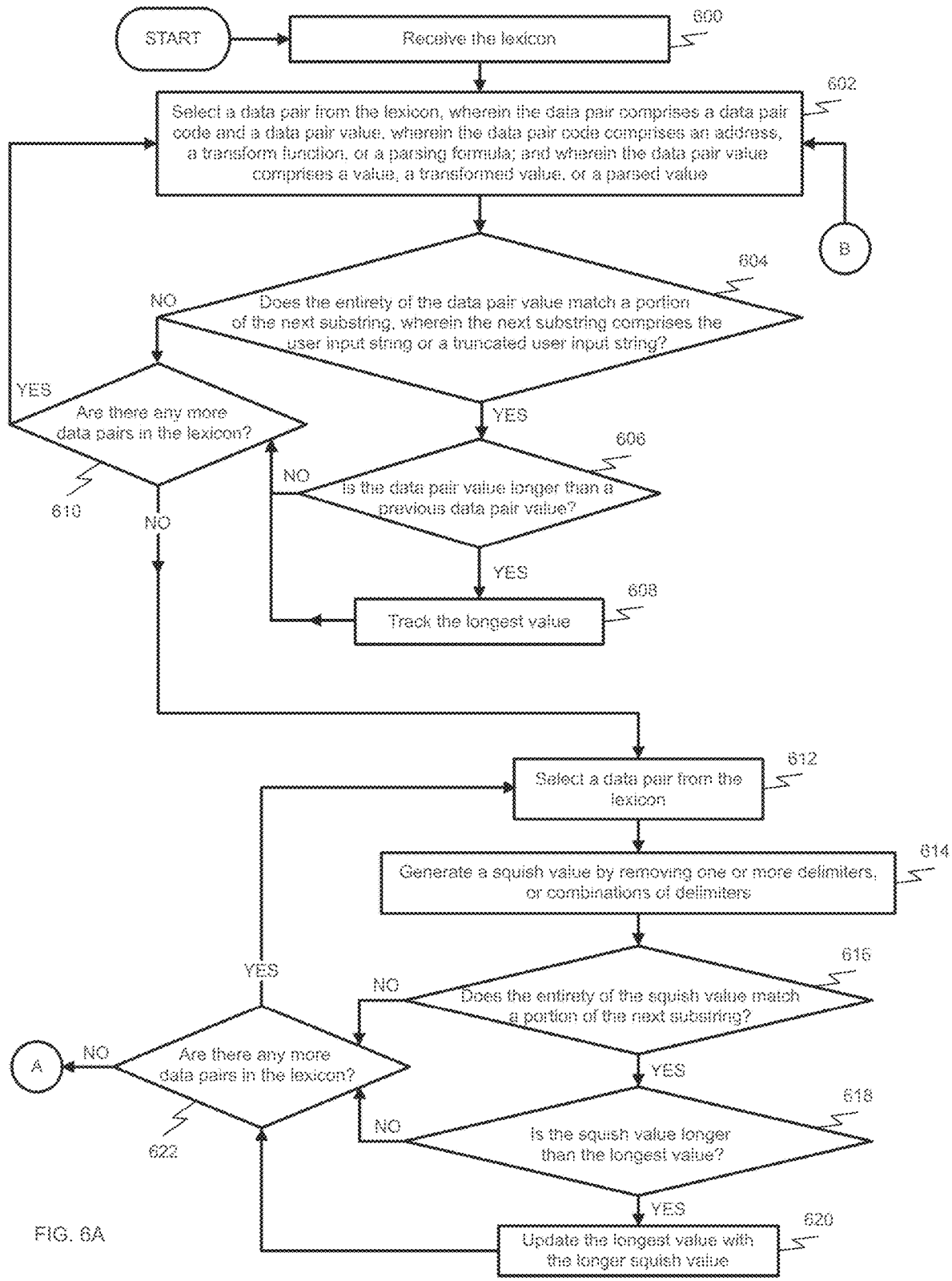
FIGS. 6A and 6B are a flow diagram illustrating an embodiment of a process for generating an efficient formula.
Figure 6B:
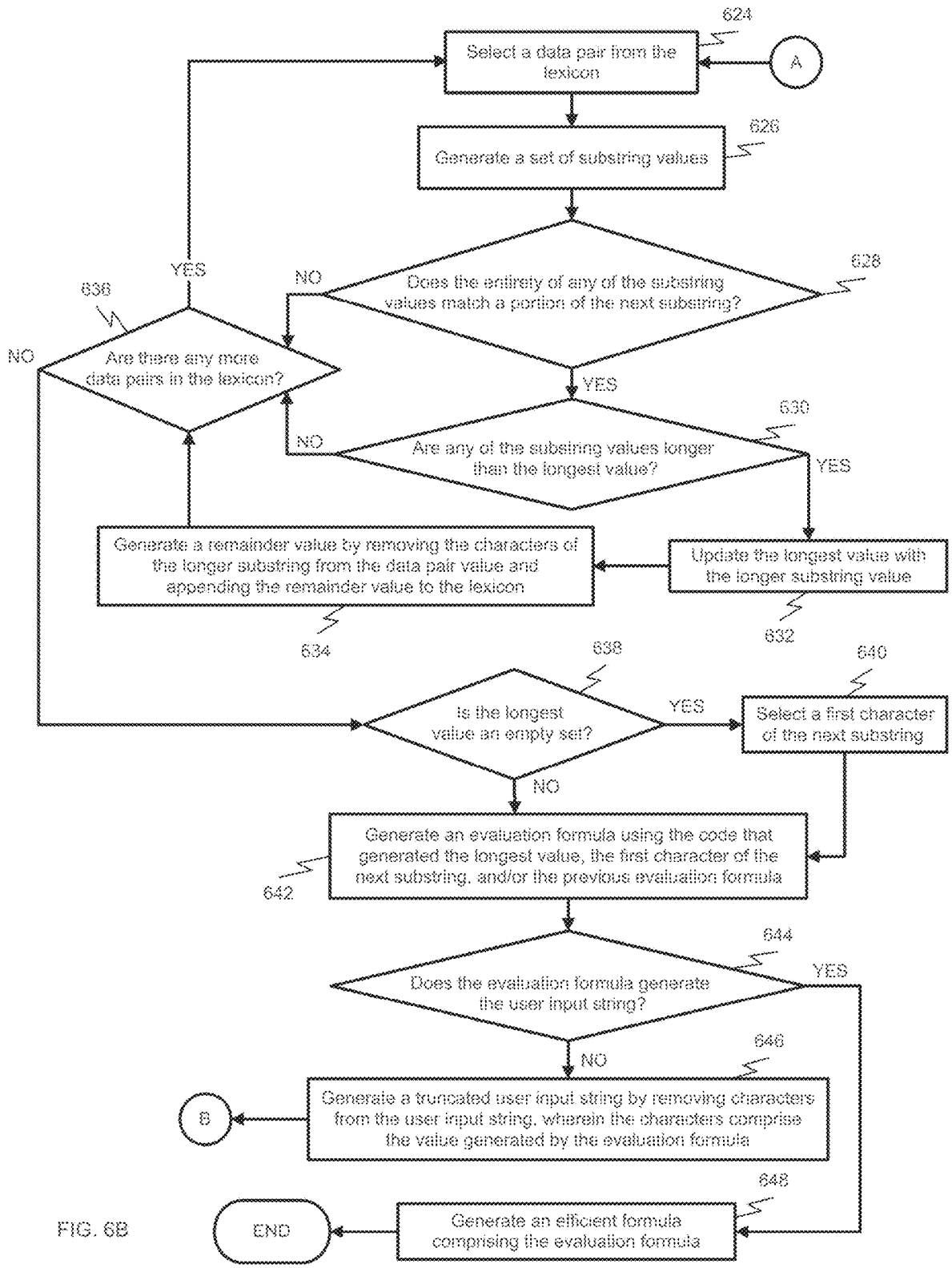

FIGS. 6A and 6B are a flow diagram illustrating an embodiment of a process for generating an efficient formula. In some embodiments, the process of FIGS. 6A and 6B is executed using the processor of formula suggestion system 108 of FIG. 1. In various embodiments, the process of FIGS. 6A and 6B is executed in whole or in part using any appropriate combination of one or more processors.

In 600, the lexicon is received. For example, an example lexicon comprising {B8: Baker}, {C8: John}, {D8: Boulder}, {E8: 111-22-3333}, {LOWER(B8): baker}, {UPPER (B8): BAKER}, {LOWER(C8): john}, {UPPER(C8): JOHN}, {LOWER(D8): boulder}, {UPPER(D8): BOULDER}, {LIST.GET(SPLIT(E8,"\-"),1): 111}, {LIST.GET (SPLIT(E8,"\-"),2): 22}, and {LET(X,SPLIT(E8,"\-"), LIST.GET(X,LIST.SIZE(X))): 3333} is received. In 602, a data pair is selected from the lexicon, wherein the data pair comprises a data pair code and a data pair value, wherein the data pair code comprises an address, a transform function, or a parsing formula; and wherein the data pair value comprises a value, a transformed value, or a parsed value. For example, the data pair {LOWER(B8): baker} is selected from the example lexicon.

In 604, it is determined whether the entirety of the data pair value matches a portion of the next substring, wherein the next substring comprises the user input string or a truncated user input string. In some embodiments, it is determined whether the entirety of the data pair value matches a portion of the next substring starting from the first character of the next substring. For example, it is determined that the entirety of the data pair value 'baker' matches a portion of the next substring, wherein the next substring comprises a truncated user input string 'baker@email.com'. In response to determining that the entirety of the data pair value does not match a portion of the next substring, control passes to 610. In response to determining that the entirety of the data pair value matches a portion of the next substring, control passes to 606.

In 606, it is determined whether the data pair value is longer than a previous data pair value. For example, it is determined that the data pair value 'baker' is longer than a previous data pair value, wherein in the example lexicon, there is no previous data pair value that matches in entirety a portion of the next substring 'baker@email.com'. In response to determining that the data pair value is not longer than a previous data pair value, control passes to 610. In response to determining that the data pair value is longer than a previous data pair value, control passes to 608.

In 608, the longest value is tracked. For example, the longest value 'baker' is tracked in computer memory. In 610, it is determined whether there are any more data pairs in the lexicon. In response to determining that there are any more data pairs in the lexicon, the process flows to 602. In response to determining that there are not any more data pairs in the lexicon, control passes to 612. For example, after the process of 602 through 610 loops through all the elements of the example lexicon and does not find a data pair value longer than the longest value 'baker', it is determined that there are no more data pairs in the lexicon, and control passes to 612.

In 612, a data pair is selected from the lexicon. For example, the data pair {E8: 111-22-3333} is selected from the example lexicon. In 614, a squish value is generated by removing one or more delimiters, or combinations of delimiters. For example, a squish value of 111223333 is generated by removing the delimiter from {E8: 111-22-3333} using the parsing formula REGEXREPLACE(F,Y,NEW).

REGEXREPLACE(F,Y,NEW) provides a new value by concatenating the parsed values of F (split on delimiter Y) using NEW to replace Y. For example, given an input F of '111-22-3333' and an input Y of '-', the parsing formula provides 111+22+3333 for an input NEW of '+' Similarly, the parsing formula provides 111223333 for an input NEW of ' ', wherein ' ' indicates the absence of any character. Thus, the squish value of {E8: 111-22-3333} is generated as {REGEXREPLACE(E8, "\-"," "): 111223333}.

In 616, it is determined whether the entirety of the squish value matches a portion of the next substring. In some embodiments, it is determined whether the entirety of the squish value matches a portion of the next substring starting from the first character of the next substring. For example, it is determined that 111223333 matches a portion of the next substring, wherein the next substring comprises a user input string 111223333. In response to determining that the entirety of the squish value does not match a portion of the next substring, control passes to 622. In response to determining that the entirety of the squish value matches a portion of the next substring, control passes to 618.

In 618, it is determined whether the squish value is longer than the longest value. For example, it is determined that the squish value 111223333 is longer than a previous longest value found in the example lexicon. In response to determining that the squish value is not longer than the longest value, control passes to 622. In response to determining that the squish value is longer than the longest value, control passes to 620.

In 620, the longest value is updated with the longer squish value. For example, the longest value is updated in computer memory with the longer squish value 111223333. In the example of a user input string comprising 111223333, the values of lexicon elements LIST.GET(SPLIT(E8,"\-"),1): 111}, {LIST.GET(SPLIT(E8,"\-"),2): 22}, and {LET(X, SPLIT(E8,"\-"),LIST.GET(X,LIST.SIZE(X))): 3333} are all found to match in entirety a portion of the user input string. As the process of 602 through 610 loops in order through the example lexicon elements, 111 is first tracked as the longest value, 22 is not tracked since it is not longer than 111, but then 3333 replaces 111 as the longest value once determined to match in entirety a portion of the user input string 111223333. In 620, the longest value 3333 is then updated with the longer squish value 111223333.

In 622, it is determined whether there are any more data pairs in the lexicon. In response to determining that there are any more data pairs in the lexicon, the process flows to 612. In response to determining that there are not any more data pairs in the lexicon, control passes to 624 in FIG. 6B. For example, after the process of 612 through 622 loops through all the elements of the example lexicon and does not find a squish value that matches in entirety a portion of the next substring and is longer than the longest value 11122333, it is determined that there are no more data pairs in the lexicon, and control passes to 624 in FIG. 6B.

In 624, a data pair is selected from the lexicon. For example, the data pair {LOWER(C8): john} is selected from the example lexicon. In 626, a set of substring values is generated. For example, the set of substring values {john, joh, jo, j} is generated. In some embodiments, the set of substring values does not comprise the data pair value. For example, {joh, jo, j} is generated since the data pair value 'john' is already in the lexicon. In some embodiments, the parsing function LEFT(F,NUM) is used to generate substring values. For example, LEFT(LOWER(C8),1) generates the substring value 'j' from the data pair {LOWER(C8): john}, LEFT(LOWER(C8),2) generates the substring value 'jo', etc.

In 628, it is determined whether the entirety of any of the substring values match a portion of the next substring. In some embodiments, it is determined whether the entirety of any of the substring values matches a portion of the next substring starting from the first character of the next substring. For example, it is determined that the entirety of the substring value 'j' matches a portion of the next substring, wherein the next substring comprises a user input string 'jbaker@email.com'. In response to determining that the entirety of any of the substring values does not match a portion of the next substring, control passes to 636. In response to determining that the entirety of any of the substring values matches a portion of the next substring, control passes to 630.

In 630, it is determined whether any of the substring values are longer than the longest value. For example, given the next substring 'jbaker@email.com', wherein matching a data pair and squish value to the next substring requires matching starting from the first character of the next substring, it is determined that the substring value 'j' is longer than the longest value since the process of FIG. 6A would not have found another longest value from the lexicon or from any squish values generated. In response to determining that any of the substring values are not longer than the longest value, control passes to 636. In response to determining that any of the substring values are longer than the longest value, control passes to 632.

In 632, the longest value is updated with the longer substring value. For example, the longest value is updated in computer memory with the longer substring value 'j'. In 634, a remainder value is generated by removing the characters of the longer substring from the data pair value and appending the remainder value to the lexicon. For example, the remainder value 'ohn' is generated by removing the longer substring value 'j' from the data pair value 'john', and 'ohn' is appended to the lexicon.

In 636, it is determined whether there are any more data pairs in the lexicon. In response to determining that there are any more data pairs in the lexicon, the process flows to 624. In response to determining that there are not any more data pairs in the lexicon, control passes to 638. For example, after the process of 624 through 636 loops through all the elements of the example lexicon and does not generate a substring value longer than the longest value 'j' that matches in entirety a portion of the next substring, it is determined that there are no more data pairs in the lexicon, and control passes to 638.

In 638, it is determined whether the longest value is an empty set. For example, it is determined whether there is a longest value being tracked, wherein a longest value not being tracked comprises an empty set. In response to determining that the longest the value is not an empty set, control passes to 642. In response to determining that the longest the value is an empty set, control passes to 640. For example, once T and 'baker' have been matched to the user input string 'jbaker@email.com', a truncated user input string of '@email.com' is generated, wherein it is determined that there is no lexicon value, no squish value, nor any substring value that matches the first character '@' of truncated user input string '@email.com'.

In 640, a first character of the next substring is selected. For example, the first character '@' of the next substring '@email.com' is selected. In 642, an evaluation formula is generated using the code that generated the longest value, the first character of the next substring, and/or the previous evaluation formula. For example, a code is generated comprising a previous evaluation formula {LEFT(LOWER(C8), 1)}&{LOWER(B8)}—which generates the value 'jbaker'—and the first character of the next substring '@' to generate the evaluation formula {LEFT(LOWER (C8),1)}&{LOWER(B8)}&"@"}.

In some embodiments, wherein a substring comprising one or more characters is found to match a portion of the next substring, it is determined whether the last character of the truncated user input string is a literal character. In response to determining that the last character of the truncated user input string is a literal character, the substring is replaced by one or more literal characters to generate the evaluation formula. For example, in generating an email address for Elaine Bryant, the process of FIGS. 6A and 6B generates a substring comprising the first character of the lower-case form of Elaine (i.e., e') to match the first character of the user input string 'ebryant@email.com'. A truncated user input string of 'bryant@email.com' is next generated, and the lower-case form of Bryant is found to match a portion of the truncated user input string resulting in a next truncated user input string of '@email.com'. As the process continues, the substring e' would be found to match the 'e' of email.com', and it is determined that the last character of the truncated user input string ebryant@' is the literal character '@'. In this example, a next evaluation formula of ebryant@e' is generated using the literal character 'e' rather than the substring form of 'e'.

In 644, it is determined whether the evaluation formula generates the user input string. For example, it is determined that the evaluation formula {LEFT(LOWER(C8),1)}&{LOWER(B8)}&"@"}—which generates the value 'jbaker@'—does not generate the user input string 'jbaker@email.com'. In response to determining that the evaluation formula generates the user input string, control passes to 648. In response to determining that the evaluation formula does not generate the user input string, control passes to 646.

In 646, a truncated user input string is generated by removing characters from the user input string, wherein the characters comprise the value generated by the evaluation formula, and the process flows to 602. For example, the truncated user input string email.com' is generated by removing the characters 'jbaker@' from the user input string 'jbaker@email.com', and the process flows to 602.

In 648, an efficient formula comprising the evaluation formula is generated, and the process ends. For example, after looping through the process of FIGS. 6A and 6B, the remaining characters of email.com' are generated literal value by literal value to finally generate the evaluation formula {LEFT(LOWER(C8),1)}&{LOWER(B8)}&"@email.com". In this example, in 644, it is determined that the evaluation formula generates the user input string jbaker@email.com', and control passes to 648 wherein the efficient formula comprising the evaluation formula {LEFT(LOWER(C8),1)}&{LOWER(B8)}&"@email.com" is generated, and the process ends.

FIG. 7A is a block diagram illustrating an example data set. In some embodiments, the example data set of FIG. 7A is used by the process of FIG. 2 to determine an efficient formula, wherein the efficient formula is provided to formula cell 702 in response to a user input string entered into formula cell 702. In the example shown, 700 is an example data set comprising rows and columns of data cells (e.g., rows 8 through 13 and columns B through F), wherein columns B through E comprise Text Field 1 (e.g., last names), Text Field 2 (e.g., first names), Text Field 3 (e.g., cities), and Text Field 4 (e.g., identification numbers), respectively. Column F comprises a Formula Column, wherein 702 comprises a formula cell in row 8 of the Formula Column. Column B includes entries Baker, Cooper, Jones, Parker, Smith, and Carter in rows 8 through 13, respectively. Column C includes entries John, Sandra, Miles, Amy, Peter, and Crissy in rows 8 through 13, respectively. Column D includes entries Boulder, Boulder, Millinocket, Dahlonega, Chicago, and SFO in rows 8 through 13, respectively. Column E includes entries 111-22-3333, 222-33-4444, 333-44-5555, 444-55-6666, 555-66-7777, and 666-77-8888 in rows 8 through 13, respectively. Column F has blanks in rows 9 through 13.

FIG. 7B is a block diagram illustrating an example code set. In some embodiments, the example code set of FIG. 7B is used by the process of FIG. 2 to generate a lexicon. In the example shown, 720 is an example code set comprising example transform functions 722, example parsing formulas 724, and example delimiters 726.

Example transform functions 722 comprise functions that transform text characters into lower, upper, and proper cases. For example, given an input F of 'Baker', LOWER(F) returns 'baker', UPPER(F) returns 'BAKER', and PROPER(F) returns 'Baker'.

Example parsing formulas 724 comprise functions that split, or parse, data cell entries (e.g., data cell entries within a spreadsheet) into component elements based on the presence of one or more delimiters. For example, given a data cell entry of '111-22-3333', the component elements (i.e., the parsed values) comprise 111, 22, and 3333. The parsed values of this example are determined based on the presence of the dash delimiter '-' (e.g., as contained within example delimiters 726). In various embodiments, delimiters comprise one or more of the following: for example, period '.', comma ',', space ' ', comma-space ',', dash slash '/', semi-colon ';', or any other appropriate single, double, or multiple character delimiter.

The parsing formula REPLACE (F,START,NUM,NEW) provides a new value by replacing the number NUM of characters of input F with NEW, starting at character START of F. For example, given an input F of '111223333', an input START of '1', an input NUM of '3', the parsing formula provides +++223333 for an input NEW of '+'. Similarly, the parsing formula provides 223333 for an input NEW of ''. In some embodiments, removing the first NUM of characters of input F (e.g., by replacing the first NUM characters with '') is used to generate a truncated user input suing.

FIG. 8A is a block diagram illustrating an example data set with an example user input string. In some embodiments, user input string 802 is used by the process of FIG. 2 to determine an efficient formula. In the example shown, 800 is the example data set of FIG. 7A wherein formula cell 702 has been filled in with user input string 802 (i.e., jbaker@email.com).

FIG. 8B is a block diagram illustrating a portion of an example data set. In some embodiments, 820 is used by the process of FIG. 3 to determine a first formula vocabulary. In the example shown, 820 is a portion of the example data set of FIG. 8A, wherein the portion of the example data set comprises the data cells of row 8 to the left of user input string 802 (i.e., values Baker, John, Boulder, and 111-22-3333 corresponding to addresses B8, C8, D8, and E8, respectively).

FIG. 8C is a block diagram illustrating an example of a first formula vocabulary. In some embodiments, 840 is generated by the process of FIG. 3 (e.g., by determining the address and value of each data cell within 820). In the example shown, 840 is a first formula vocabulary generated from 820 of FIG. 8B. The first formula vocabulary 840 comprises the following elements: {B8: Baker}, {C8: John}, {D8: Boulder}, and {E8: 111-22-3333}, wherein each element of 840 comprises an address and value.

FIG. 8D is a block diagram illustrating an example of a second formula vocabulary. In some embodiments, 860 is generated by the process of FIG. 4 (e.g., by applying the example transform functions 722 of FIG. 7B to each value within 840 and appending the transformed values to first formula vocabulary 840). In the example shown, 860 is a second formula vocabulary generated from 840 of FIG. 8C. In some embodiments, the second formula vocabulary comprises a first formula vocabulary. In the example shown, second formula vocabulary 860 comprises the elements of first formula vocabulary 840 (i.e., 862 {B8: Baker}, 864 {C8: John}, 866 {D8: Boulder}, and 868 {E8: 111-22-3333}. Second formula vocabulary 860 also comprises elements of first formula vocabulary 840 that have been transformed (e.g., transformed by example transform functions 722 of FIG. 7B).

Since the proper case values of Baker, John, and Boulder of first formula vocabulary 840 were already contained in a second list (e.g., the second list of 408 in FIG. 4), the PROPER(F) transformed values of Baker, John, and Boulder (i.e., Baker, John, and Boulder) and the associated transform functions (i.e., PROPER(B8), PROPER(C8), and PROPER(D8)) were not appended to the second list. Since the second formula vocabulary comprises the second list, the elements {PROPER(B8): Baker}, {PROPER(C8): John}, and {PROPER(D8): Boulder}, are not included in second formula vocabulary 860.

Similarly, since the value 111-22-3333 of first formula vocabulary 840 results in the transformed value of 111-22-3333 for all example transform functions 722, the elements {LOWER(E8): 111-22-3333}, {UPPER(E8): 111-22-3333}, and {PROPER(E8): 111-22-3333} are also not included in second formula vocabulary 860.

FIG. 9A is a block diagram illustrating an example of a lexicon. In some embodiments, 900 is generated by the process of FIG. 5 (e.g., by applying a selected subset of the example parsing formulas 724 of FIG. 7B to each value within 820 and appending the parsed values to second formula vocabulary 860). In the example shown, 900 is a lexicon generated from the second formula vocabulary of FIG. 8D. In some embodiments, the lexicon comprises a second formula vocabulary. In the example shown, lexicon 900 comprises the elements of second formula vocabulary 860. Lexicon 900 also comprises elements of second formula vocabulary 860 that have been parsed (e.g., parsed by a selected subset of example parsing formulas 724 of FIG. 7B and parsed based on a selected subset of example delimiters 726).

In the example shown, the selected subset of example parsing formulas 724 used to parse the elements of first formula vocabulary 840 comprise LIST.GET(SPLIT(F,Y), 1), LIST.GET(SPLIT(F,Y),2) and LET(X,SPLIT(F,Y), LIST.GET(X,LIST.SIZE(X))). The selected parsing formulas respectively return the first, second, and last parsed elements of any values in second formula vocabulary 860 that contain one or more selected delimiters (e.g., {E8: 111-22-3333}). Using the dash delimiter, and the selected parsing formulas, the process of FIG. 5 results in the following parsing formulas and associated parsed element values being added to a third list (e.g., the third list of 512 in FIG. 5): {LIST.GET(SPLIT(E8,"\-"),1): 111} {LIST.GET (SPLIT(E8,"\-"),2): 22} LET(X,SPLIT(E8,"\-"),LIST.GET (X,LIST.SIZE(X))): 3333}.

In various embodiments, straight quotes " ", and straight quotes in combination with certain characters (e.g., a backward slash '\', square brackets '[ and]' or '[' and ']' etc.) are a computer syntax used to indicate how a formula should interpret certain other characters, or character combinations, that are placed between the quotes. For example, SPLIT(F, "\-") uses straight quotes and a backward slash to indicate the SPLIT function should use the dash as the delimiter to generate a parsed element set of F. In another example, SPLIT(F, "[,]") uses straight quotes and square brackets (i.e., "[,]" as a regular expression, where the "(straight-quotes) indicate the ends of the string which is a regex, and where the [ ]'s indicating what is contained within is a character-class, and that the elements allowed are a space or a comma. So "[,]" the SPLIT function should break into elements whenever encountering either a space or a comma.

Since a lexicon comprises a third list, and a third list comprises a second formula vocabulary, lexicon 900 comprises the elements of second formula vocabulary 860 and the aforementioned parsing formulas and associated parsed element values of {E8: 111-22-3333}. In some embodiments, the order of the elements in the lexicon are maintained in the order generated respectively by the processes of FIGS. 3, 4, and 5, In some embodiments, the order of the elements in the lexicon comprises reordering the elements in any appropriate fashion.

FIG. 9B is a block diagram illustrating an example of evaluation formulas. In some embodiments, evaluation formulas 920 are generated using the process of FIGS. 6A and 6B to generate a longest value, a first character of a next substring, and/or a previous evaluation formula based on user input string 802 of FIG. 8A and a portion of the example data set 820 of FIG. 8B. In the example shown, evaluation formulas 920 are a set of evaluation formulas generated from lexicon 900 of FIG. 9A. In some embodiments, an evaluation formula is generated by concatenating one or more elements comprising one or more of the following: a longest value, a literal character, a previous evaluation formula. In some embodiments, a special character is used to concatenate the elements of the evaluation formula (e.g., an ampersand character '&').

Evaluation formula {LEFT(LOWER(C8),1)} generates a—from data cell C8 based on matching a portion of the user input string (i.e., the 'j' of jbaker@email.com). LOWER (C8) is generated by the process of determining a second formula vocabulary comprising the lower case transformed element C8 and its associated value (i.e., {LOWER(C8): john} contained in the second formula vocabulary. {LEFT (LOWER(C8), 1)} is generated as part of generating a set of substring values from the data pair {LOWER(C8): john}. The value 'john' of {LOWER(C8): john} is tracked as the longest value that matches a portion of the next substring, wherein the next substring in this instance is the user input string.

A truncated user input string is next generated by removing the character from jbaker@email.com (i.e., by removing the 'j' generated by the first evaluation formula of evaluation formulas 920) to generate a next substring 'baker@email.com' The entirety of data pair value {LOWER(B8): baker} is then found to match a portion of the next substring 'baker@email.com'. A next evaluation formula is generated by concatenating {LOWER(B8)} with {LEFT (LOWER(C8),1)} to generate {LEFT(LOWER(C8), 1)}&{LOWER(B8)} (i.e., the second evaluation formula of evaluation formulas 920 of FIG. 9B). {LEFT(LOWER(C8), 1)}&{LOWER(B8)} generates 'jbaker' resulting in a truncated user input string of '@email.com' (i.e., the next substring).

At this point in the process of generating the evaluation formulas exhibited in 920, neither the lexicon generated from the second formula vocabulary, squished values of that lexicon, nor substring values of that lexicon generate a match to the next substring '@email.com'. In this example, a first character (e.g., a first literal) of the next substring (i.e., '@') is selected to generate the next evaluation formula {LEFT(LOWER(C8),1)}&{LOWER(B8)}&"@". The process continues in this fashion to generate evaluation formulas literal by literal until finally evaluation formula 922 LEFT(LOWER(C8),1)}&{LOWER(B8)}&"@email.com" generates the user input string (i.e., jbaker@email.com). An efficient formula is then generated comprising evaluation formula 922, and the process ends.

FIG. 10A is a block diagram illustrating a portion of a second example data set with a second example user input string. In some embodiments, the portion of the second example data set of FIG. 10A is used by the process of FIG. 2 to determine an efficient formula, wherein the efficient formula is provided to formula cell 1002 in response to a user input string entered into formula cell 1002 (e.g., user input string 1004). In the example shown, 1000 is a portion of a second example data set comprising a row and columns (e.g., row 14 and columns I and J). Column I comprises Text Field 1 (e.g., a first and last name, and a country code) and column J comprises a Formula Column, wherein 1002 comprises a formula cell in row 14 of the Formula Column. Data cell 114 includes the value 'Ronnie Anderson, UK' and formula cell J14 includes 'RAnderson' (i.e., the second example user input string 1004).

FIG. 10B is a block diagram illustrating an example of a first formula vocabulary. In some embodiments, first formula vocabulary 1020 is generated by the process of FIG. 3 by determining the address and value of the data cell within 1000. In the example shown, first formula vocabulary 1020 is generated from the data cell. First formula vocabulary 1020 comprises the element {I14: Ronnie Anderson, UK}.

FIG. 10C is a block diagram illustrating an example of a second formula vocabulary. In some embodiments, second formula vocabulary 1040 is generated by the process of FIG. 4 by applying the example transform functions 722 of FIG. 7B to the value within first formula vocabulary 1020 of FIG. 10B (i.e., Ronnie Anderson, UK) and appending the transformed values to the first formula vocabulary. In the example shown, second formula vocabulary 1040 comprises the single element of a first formula vocabulary (i.e., {I14: Ronnie Anderson, UK}). Second formula vocabulary 1040 also comprises transformed elements generated from the first formula vocabulary.

FIG. 10D is a block diagram illustrating an example of a lexicon. In some embodiments, lexicon 1060 is generated by the process of FIG. 5 by applying a selected subset of the example parsing formulas 724 of FIG. 7B to each value within second formula vocabulary 1040 of FIG. 10C and appending the parsed values to second formula vocabulary 1040. In the example shown, lexicon 1060 is generated from the second formula vocabulary. In the example shown, lexicon 1060 comprises the elements of second formula vocabulary. Lexicon 1060 also comprises elements of the second formula vocabulary that have been parsed (e.g., parsed by a selected subset of example parsing formulas and parsed based on a selected subset of example delimiters).

In the example shown, the selected subset of example parsing formulas used to parse the elements of second formula vocabulary comprise LIST.GET(SPLIT(F,Y),1), LIST.GET(SPLIT(F,Y),2), and LET(X,SPLIT(F,Y), LIST.GET(X,LIST.SIZE(X))). The selected parsing formulas respectively return the first, second, and last parsed elements of any values in second formula vocabulary that contain one or more selected delimiters.

In the example shown, the selected subset of delimiters comprise space ' ', comma ',', and comma or space (e.g., as indicated by the computer syntax "[,]" as a regular expression, where the "(straight-quotes) indicate the ends of the string which is a regex, and where the [ ]'s indicating what is contained within is a character-class, and that the elements allowed are a space or a comma. So "[,]" the SPLIT function should break into elements whenever encountering either a space or a comma.).

Using the selected subsets of parsing formulas and delimiters, the process of determining a lexicon results in the following parsed element values being added to a third list along with their respective parsing formulas: Ronnie, 'Anderson,' (i.e., a comma following Anderson), UK, Ronnie Anderson, ' UK' (i.e., a space preceding UK), Anderson, Ronnie, 'anderson,' (i.e., a comma following anderson), uk, ronnie anderson, uk' (i.e., a space preceding uk), anderson, RONNIE, 'ANDERSON,' (i.e., a comma following ANDERSON), RONNIE ANDERSON, ANDERSON, Uk, and ' Uk' (i.e., a space preceding Uk).

Since a lexicon comprises a third list, and a third list comprises a second formula vocabulary, lexicon 1060 comprises the elements of the second formula vocabulary and the aforementioned parsed element values and associated parsing formulas of {I14: Ronnie Anderson, UK}.

FIG. 10E is a block diagram illustrating an example of evaluation formulas. In some embodiments, evaluation formulas 1080 are generated using the process of FIGS. 6A and 6B to generate a longest value, a first character of a next substring, and/or a previous evaluation formula based on user input string 1004 of FIG. 10A and a portion of second example data set 1000 of FIG. 10A. In the example shown, evaluation formulas 1080 are a set of evaluation formulas generated from a lexicon.

The first evaluation formula {LEFT(I14), 1)} of evaluation formulas 1080 generates an 'R' from the input data cell 114 and is based on matching a portion of user input string (i.e., the 'R' of RAnderson). The value associated with {LEFT(I14),1)} (i.e., 'R') is generated as a substring of the first lexicon element {I14: Ronnie Anderson, UK}. Using the 'R' value generated by evaluation formula {LE FT(I14), 1)}, the process generates the truncated user input string of 'Anderson' which value matches in entirety the value output of {LIST.GET(SPLIT(I14,"[,]"),2)} contained in the lexicon. Concatenating the two formulas results in 1082 (i.e., LEFT(I14,1)}&{{LIST.GET(SPLIT(I14, "[,]"),2)}), the final evaluation formula required to generate user input string (i.e., RAnderson).

FIG. 11A is a block diagram illustrating an example data set with another example user input string. In some embodiments, user input string 1102 is used by the process of FIG. 2 to determine an efficient formula. In the example shown, 1100 is the example data set of FIG. 7A wherein formula cell 702 has been filled in with user input string 1102 (i.e., 111223333).

FIG. 11B is a block diagram illustrating an example of a lexicon. In some embodiments, lexicon 1120 is generated by the processes of FIGS. 3 through 5 by determining the address and value of the data in the portion of the data set to the left of user input string 1102 of FIG. 11A to create a first formula vocabulary, transforming the values of the first formula vocabulary to create a second formula vocabulary, and parsing the values of the second formula vocabulary using the dash '-' delimiter to create lexicon 1120.

FIG. 11C is a block diagram illustrating an example of an evaluation formula. In some embodiments, evaluation formula 1140 is generated using the process of FIGS. 6A and 6B to generate an evaluation formula based on a longest squish value generated from lexicon 1120 of FIG. 11B. In the example shown, evaluation formula 1140 {REGEXREPLACE(E8,"\-", " ")} provides the squish value 111223333 by concatenating the parsed element values of {E8: 111-22-3333} of the lexicon using " " (i.e., the absence of any character) to replace the dash delimiter (i.e., as shown in the syntax "\-").

FIG. 11D is a block diagram illustrating an example data set with an auto-filled formula column. In some embodiments, data set 1160 is generated in part by using the process of FIGS. 6A and 6B to generate an efficient formula comprising evaluation formula 1140 of FIG. 11C and the process of FIG. 2 by providing the efficient formula to an other formula cell. In the example shown, when the efficient formula is provided to data cell F8 of data set 1160, a computer program (not shown) is triggered to automatically fill in the remaining empty formula cells of formula column F with the efficient formula, wherein E8 is replaced by the address of the data cells corresponding to the next data cell of column E (i.e., E9, E10, E11, E12, and E13) to return the values 222334444, 333445555, 444556666, 555667777, and 66677888, respectively.

Figure 12:
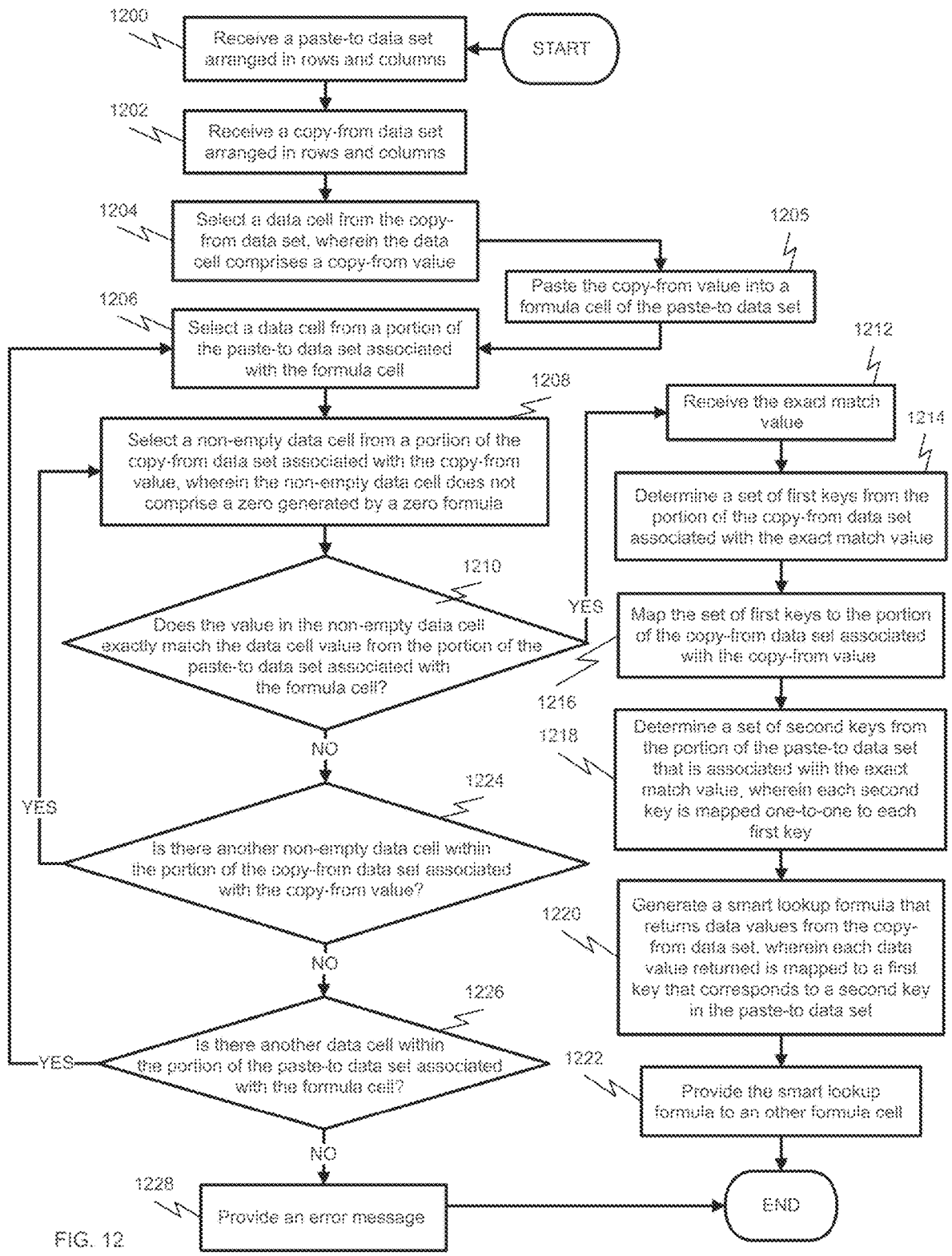
FIG. 12 is a flow diagram illustrating an embodiment of a process for generating a smart lookup formula.

FIG. 12 is a flow diagram illustrating an embodiment of a process for generating a smart lookup formula. In some embodiments, the process of FIG. 12 is executed using the processor of formula suggestion system 108 of FIG. 1. In various embodiments, the process of FIG. 12 is executed in whole or in part using any appropriate combination of one or more processors.

In 1200, a paste-to data set arranged in rows and columns is received. For example, a paste-to data set from a spreadsheet application arranged in rows and columns is received, wherein a data cell of the paste-to data set comprises a formula cell configured to receive a smart lookup formula in response to a copy-from value being pasted into the formula cell. In some embodiments, the data cell of the paste-to data set comprises a formula cell. In some embodiments, the generated formula or generated data is provided to a formula cell or column as designated (e.g., the same cell as the paste-to cell, a different cell, a designated cell, etc.).

In 1202, a copy-from data set arranged in rows and columns is received. For example, a copy-from data set arranged in rows and columns is received, wherein a data cell in the copy-from data set comprises a value to be copied and pasted into an other formula cell of the paste-to data set. In some embodiments, the data generated in this process is generated in a data cell or a formula cell that is adjacent to the paste-to cell location or any other designated location.

In 1204, a data cell is selected from the copy-from data set, wherein the data cell comprises a copy-from value. For example, the copy-from value of the copy-from data set is related to a portion of the copy-from data set wherein the values of the related portion also exist in a portion of the paste-to data set. For example, the copy-from value is an employee status value related to a portion of the copy-from data set comprising employee identification numbers, wherein the employee identification numbers also exist in a portion of the paste-to data set.

In 1205, the copy-from value is pasted into a formula cell of the paste-to data set. For example, the employee status value from a portion of the copy-from data set is pasted into a formula cell of the paste-to data set. In 1206, a data cell is selected from a portion of the paste-to data set associated with the formula cell. For example, a data cell comprising an employee's identification number is selected from a portion of the paste-to data set associated with the formula cell.

In 1208, a non-empty data cell is selected from a portion of the copy-from data set associated with the copy-from value, wherein the non-empty data cell does not comprise a zero generated by a zero formula. For example, a non-empty data cell comprising the employee's identification number is selected. In 1210, it is determined whether the value in the non-empty data cell exactly matches the data cell value from the portion of the paste-to data set associated with the formula cell. In response to determining that the value in the non-empty data cell does not exactly match the data cell value from the portion of the paste-to data set, control passes to 1224. In response to determining that the value in the non-empty data cell exactly matches the data cell value from the portion of the paste-to data set, control passes to 1212. For example, it is determined that the employee's identification number of the non-empty data cell exactly matches the employee's identification number selected from a portion of the paste-to data set.

In 1212, the exact match value is received. For example, the employee's identification number of the non-empty data cell is received. In 1214, a set of first keys is determined from the portion of the copy-from data set associated with the exact match value. For example, it is determined that the set of first keys comprises a column of employee identification numbers, wherein the column of employee identification numbers also comprises the employee's identification number of the non-empty data cell.

In 1216, the set of first keys is mapped to the portion of the copy-from data set associated with the copy-from value. For example, the column of employee identification numbers is mapped to a column of the portion of the copy-from data set comprising employee status values (i.e., the column of the portion of the copy-from data set that also comprises the copy-from employee status value).

In 1218, a set of second keys is determined from the portion of the paste-to data set that is associated with the exact match value, wherein each second key is mapped one-to-one to each first key. For example, it is determined that the set of second keys comprises a column of employee identification numbers in the paste-to data set, wherein the column of employee identification numbers also comprises the employee's identification number of the exact match value. Further, each employee identification number in the paste-to data set is mapped one-to-one to each employee identification number in the copy-from data set. One-to-one mapping in this example means that each employee identification number contained in the second set of keys (e.g., 111223333) is mapped to the same employee identification number in the first set of keys (e.g., 111223333 of the second set of keys is mapped to 111223333 of the first set of keys).

In 1220, a smart lookup formula is generated that returns data values from the copy-from data set, wherein each data value returned is mapped to a first key that corresponds to a second key in the paste-to data set. For example, a smart lookup formula is generated that returns the employee status value from the copy-from data set associated with the employee identification number in the copy-from data set that matches the same employee identification number in the paste-to data set. For example, the employee status value in the copy-from data set associated with '111223333' is returned. In some embodiments, an additional portion of the copy-from data set is used to confirm that the identified first set of keys returns a value from the copy-from data set using the smart lookup formula that does not comprise a zero generated by a zero formula, an empty data cell, or any other undesired value before providing the smart lookup formula.

In 1222, the smart lookup formula is provided to an other formula cell, and the process ends. In some embodiments, the other formula cell comprises the formula cell into which the user initially provided the input string. For example, a smart lookup formula that returns the employee status value associated with '111223333' is provided to the formula cell of the paste-to data set, and the process ends. In some embodiments, the other formula cell is not the formula cell into which the user initially provided the input string. For example, the other formula cell is adjacent to the formula cell into which the user initially provided the input string, in a different column from the formula cell into which the user initially provided the input string, or any other appropriate formula cell.

In some embodiments, when the smart lookup formula is provided to the other formula cell, a computer program is triggered to automatically provide the smart lookup formula to other formula cells within the data set (e.g., to formula cells associated with the data cell). In some embodiments, the smart lookup formula is automatically adjusted to reference a source data within the data set so as to provide a second key. For example, the smart lookup formula is automatically adjusted to reference the source data cell in the paste-to data set to generate a second key associated with the formula cell that is mapped one-to-one with a first key in the copy-to data set that is associated with the copy-from value.

In some embodiments, a smart lookup formula comprises the following form: WD.SMARTLOOKUP(F,TABLE, KEY1,MAP), wherein F is a formula that returns a second key (i.e., a second key from the set of second keys) from an input comprising a data cell of the portion of paste-to data set, wherein the portion of the paste-to data set is associated with the formula cell configured to receive the smart lookup formula. TABLE references the copy-from data set comprising a table of data in rows and columns. KEY1 references the data cells within TABLE that corresponds to the first set of keys. MAP references the data cells within TABLE that corresponds to the portion of the copy-from data set associated with the copy-from value that is mapped to the first set of keys (i.e., the data cells associated with MAP are mapped to the data cells associated with KEY1). The smart lookup formula WD.SMARTLOOKUP(F, TABLE,KEY1,MAP) provides the value MAP to the formula cell in the paste-to data set wherein it is provided. The value MAP is a value from the copy-from data set mapped to a first key (i.e., a first key from the set of first keys) that is one-to-one mapped to a second key in the paste-to data set, wherein the second key is generated by F.

In 1224, it is determined whether there is another non-empty data cell within the portion of the copy-from data set associated with the copy-from value. For example, it is determined whether there is another non-empty data cell within the portion of the copy-from data set which does not also comprise a zero generated by a zero formula. In response to determining that there is another non-empty data cell within the portion of the copy-from data set, the process flows to 1208. In response to determining that there is not another non-empty data cell within the portion of the copy-from data set, control passes to 1226.

In 1226, it is determined whether there is another data cell within the portion of the paste-to data set associated with the formula cell. In response to determining that there is another data cell within the portion of the paste-to data set, the process flows to 1206. In response to determining that there is not another data cell within the portion of the paste-to data set, control passes to 1228. In 1228, an error message is provided, and the process ends. For example, an error message is provided to the user indicating no exact match value was found, and the process ends.

In various embodiments, the copy-from or source data set and the paste-to or destination data set are designated using other mechanisms than a copy/paste indication—for example, a selection and dragging, a double tapping and pointing, or any other manner of indicating a source and destination data set.

FIG. 13A is a block diagram illustrating an example paste-to data set. In some embodiments, example paste-to data set 1300 is used by the process of FIG. 12 to determine a smart lookup formula, wherein the smart lookup formula is provided to formula cell 1302 in response to a copy-from value entered into formula cell 1302. In the example shown, 1300 is the example data set 1160 of FIG. 11D with an added formula column G.

FIG. 13B is a block diagram illustrating an example copy-from data set. In some embodiments, example copy-from data set 1320 is used by the process of FIG. 12 to determine a smart lookup formula, wherein data cell D16 of FIG. 13B comprises copy-from value 1322 that is pasted into an empty formula cell. In some embodiments, the copy-from data set is in a report region associated with the paste-to data set. In various embodiments, the copy-from data set is in another report or workbook associated with the paste-to data set. In the example shown, example copy-from data set 1320 comprises rows and columns of data cells (e.g., rows 16 through 21 and columns B through D), wherein columns B through D comprise Text Field A (e.g., squish forms of identification numbers), Text Field B (e.g., status codes), and Text Field C (e.g., status values), respectively. Column B includes entries 111223333, 666778888, 222334444, 555667777, 333445555, and 444556666, in rows 16 through 21, respectively. Column C includes entries empty data cell, empty data cell, 1, 1, 0, 2, in rows 16 through 21, respectively. Column D includes entries qualified, qualified, rehire, rehire, retired, and pay benefits in rows 16 through 21, respectively.

FIG. 13C is a block diagram illustrating an example paste-to data set with an auto-filled formula column. In some embodiments, example paste-to data set with an auto-filled formula column 1340 is generated by the process of FIG. 12 in response to copy-from value 1322 of FIG. 13B being pasted into formula cell 1302 of FIG. 13A. In the example shown, the process determines an exact match of the data cell value from the portion of the paste-to data set associated with the formula cell (i.e., determines an exact match of the data cell value of data cell F8) with a non-empty data cell from a portion of the copy-from data set associated with the copy-from value (i.e., with the data cell value of data cell B16). In response to determining the exact match (i.e., the data cell value of 111223333 in F8 is determined to exactly match the data cell value of 111223333 in B16), the process determines a set of first keys from copy-from data set (i.e., the values in column B) and maps them to the portion of the copy-from data set associated with the copy-from value (i.e., maps the values in column B to the values in column D). The process next determines a second set of keys from the portion of the paste-to data set that is associated with the exact match value (i.e., the second set of keys are determined to be the values in column F since they are associated with the exact match value of 11122333).

A smart lookup formula is next generated from the established sets of first and second keys and associated mapping relationship as WD.SMARTLOOKUP (REGEXREPLACE(E8,"\-"," "),$B$15#,1,3). REGEXRE- PLACE(E8,"\-"," ") is the formula within formula cell F8 of paste-to data set that generates the squished value of 111223333. $B$15# references the data set contained within copy-from data set. The '1' and '3' reference the first and third columns of data set $B$15#. The first column of data set $B$15# (i.e., column B) comprises the first set of keys that is mapped to the values within the third column of $B$15# (i.e., column D). The values within the Formula 1 column (i.e., column F) comprise the second set of keys. Thus the above WD.SMARTLOOKUP formula returns the value 'qualified' when provided to a designated formula cell (i.e., returns the value within data cell D16 that is mapped via the exact match value of 111223333 to the designated formula cell). Receiving the smart formula into the designated formula cell triggers a computer program (not shown) to automatically fill in the remaining empty formula cells of formula column 2 with the smart lookup formula, wherein E8 of the above WD.SMARTLOOKUP formula is automatically replaced by the address of the data cell corresponding to the next data cell of column E. The one-to-one mapping of each second key to each first key provides for returning the correct value even when the data associated with the first and second keys is out of order. For example, WD.SMARTLOOKUP(REGEXREPLACE(F8,"\-"," "),$B$15#,1,3), wherein E8 has been auto-incremented to F8, returns 'rehire' to formula cell G9 since it is mapped via key value 222334444.

Figure 14:
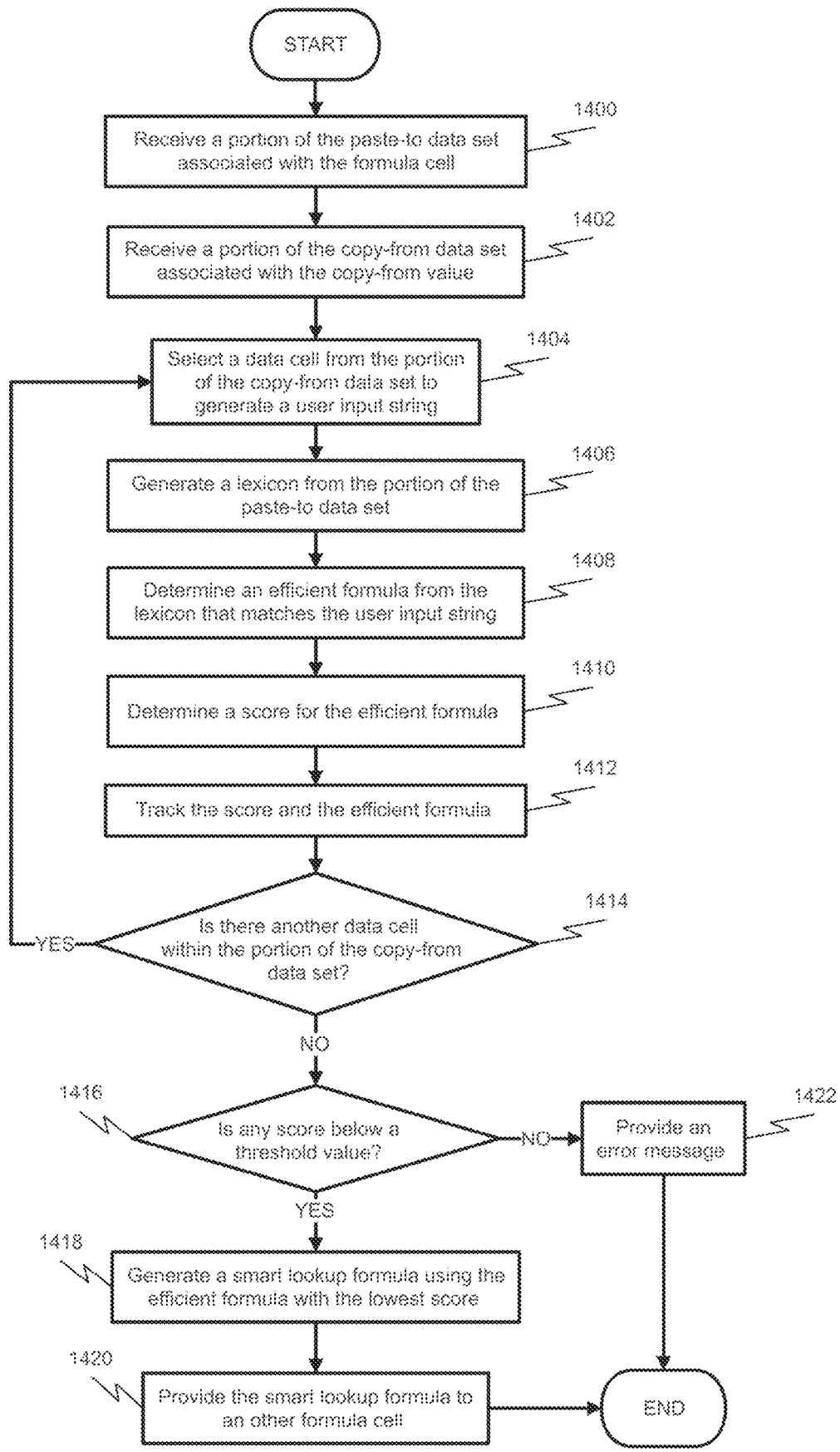
FIG. 14 is a flow diagram illustrating an embodiment of a process for providing a smart lookup formula with a lowest score.

FIG. 14 is a flow diagram illustrating an embodiment of a process for providing a smart lookup formula with a lowest score. In some embodiments, the process of FIG. 14 is executed using the processor of formula suggestion system 108 of FIG. 1. In various embodiments, the process of FIG. 14 is executed in whole or in part using any appropriate combination of one or more processors.

In some embodiments, the process of FIG. 14 is used in the event the process of FIG. 12 has been unable to determine a smart lookup formula. For example, the process of FIG. 14 is used in the event that the process of FIG. 12 has been unable to find a value from any non-empty data cell in the portion of the copy-from data set that exactly matches any data cell value from the portion of the paste-to data set associated with the formula cell.

In 1400, a portion of the paste-to data set associated with the formula cell is received. For example, a portion of a paste-to data set from a spreadsheet application comprising a row or column of two or more data cells is received, wherein a data cell of the portion of the paste-to data set comprises a formula cell configured to receive an efficient formula with a lowest score in response to a copy-from value being pasted into the data cell. For example, one or more efficient formulas are determined and scored (e.g., scored heuristically) wherein the efficient formula with the lowest score is provided. In some embodiments, wherein one or more efficient formulas are determined, and the one or more efficient formulas are determined to have the same score, the first efficient formula determined with a lowest score is provided. In some embodiments, wherein one or more efficient formulas are determined, the user is given a choice to select one of the one or more efficient formulas.

In 1402, a portion of the copy-from data set associated with the copy-from value is received. For example, a portion of a copy-from data set comprising a row or column of two or more data cells is received, wherein a data cell in the portion of the copy-from data set comprises a value to be copied and pasted into the formula cell of the portion of the paste-to data set.

In 1404, a data cell is selected from the portion of the copy-from data set to generate a user input string. For example, a data cell comprising an employee's identification number is selected (e.g., {B16: 111223333}) to generate a user input string, wherein the user input string is used to generate an efficient formula. In some embodiments, a non-empty data cell is selected from the portion of the copy-from data, wherein the non-empty data cell does not comprise a zero generated by a zero formula.

In 1406, a lexicon is generated from the portion of the paste-to data set. For example, a lexicon comprising data pairs is generated from the portion of the paste-to data set, wherein the data pairs comprise a data pair code and a data pair value, wherein the data pair code comprises an address, a transform function, or a parsing formula; and wherein the data pair value comprises a value from the portion of the paste-to data set, a transformed value from the portion of the paste-to data set, or a parsed value from the portion of the paste-to data set.

In 1408, an efficient formula is determined from the lexicon that matches the user input string. For example, the efficient formula REGEXREPLACE(E8,"\-"," ") generates the value '111223333' from lexicon element {E8: 111-22-3333}, wherein {E8: 111-22-3333} is an element of the lexicon generated from the example paste-to data set of FIG. 13A. The output '111223333' of the efficient formula is determined to match the user input string {B16: 111223333} (e.g., the user input string comprising data cell B16 from the example copy-from data set of FIG. 13B).

In 1410, a score is determined for the efficient formula. In some embodiments, the score is a single numeric value. In some embodiments, a lower score is considered more efficient (i.e., 'better') than a higher score. In some embodiments, a higher score is considered more efficient (i.e., 'better') that a lower score. In some embodiments, the score is based on the complexity of the formula used to generate a first key of the first key set of the copy-from data set. In some embodiments, the score is based on the length of a first key within the copy-from data set. In some embodiments, the score is based on a combination of formula complexity and first key length. For example, the score is based on the ratio of the complexity divided by the first key length, wherein the ratio is such that a lower score is better than a higher score. In some embodiments, the score considers a shortness penalty based on the first key length. In some embodiments, the score is based on a combination of formula complexity, first key length, and shortness penalty. For example, the score is based on the ratio of the sum of the complexity plus the shortness penalty divided by the first key length. In some embodiments, the score is based on any appropriate measure of complexity or efficiency. In some embodiments, the complexity, efficiency, penalty or any other appropriate measure of complexity or efficiency is determined heuristically. In some embodiments, the score considers the efficient formula with the least number of characters to have the best score.

In some embodiments, the complexity is determined by attributing one point (i.e., the numerical value of one) to each formula element and two points to each literal element within an efficient formula and summing the number of points. In some embodiments, the first key length is determined by attributing one point to each character comprising the first key and summing the number of points. In some embodiments, the shortness penalty is attributed one point, wherein the shortness penalty is inversely proportional to the first key length. In various embodiments, any appropriate number of points is assigned to any of the factors that comprise the scoring formula (e.g., the complexity, the first key length, the shortness penalty, or any other appropriate factor).

Given a first scoring example where the complexity equals 28 and the first key length equals 14, wherein the score is based on the ratio of the complexity plus the shortness penalty divided by the first key length—i.e., the score=(complexity+shortness penalty)/(first key length)—the scoring example equals 2.071 (i.e., the score=(28+1)/14). Without the shortness penalty, wherein the score is based only on the ratio of the complexity divided by the first key length, the score equals 2.0.

Given a second scoring example where the complexity equals 1 and the first key length equals 1, wherein the score is based on the ratio of the complexity plus the shortness penalty divided by the first key length—i.e., the score=(complexity+shortness penalty)/(first key length)—the scoring example equals 2.0. Without the shortness penalty, wherein the score is based on the ratio of the complexity divided by the first key length, the score equals 1.0. So, for shorter first key lengths, the inclusion of a shortness penalty in this second example doubles the impact of a short first key length on the score compared to the first example where the much longer key length only impacted the score by 3.55%—i.e., ((2.071−2.0)/2.0)*100=3.55%. Thus, the inclusion of a shortness penalty in the scoring formula disfavors shorter first key lengths.

In 1412, the score and the efficient formula are tracked. For example, the efficient formula REGEXREPLACE(E8, "\-"," ") with a score of 0.222 is tracked in computer memory. In this example, the score is determined using the scoring formula (complexity+shortness penalty)/(first key length) wherein the complexity in this example is 1 (i.e., 1 point assigned to the REGEXREPLACE formula), the shortness penalty is 1, and the first key length of '111223333' is 9 (i.e., 1 point assigned to each character). Thus, the score in this example is (1+1)/9 =0.222.

In 1414, it is determined whether there is another data cell within the portion of the copy-from data set. For example, after looping through the process of 1404 through 1414, it is determined that there is not another data cell in the copy-from data set. In response to determining that there is another data cell within the portion of the copy-from data set, the process flows to 1404. In response to determining that there is not another data cell within the portion of the copy-from data set, control passes to 1416.

In 1416, it is determined whether there is any score below a threshold value. For example, it is determined that there is a score (e.g., a score of 0.222) below a threshold value (e.g., a threshold value of 1.0). Setting a threshold of 1.0 favors efficient formulas with lower complexity, longer first key lengths, and screens out empty data cells and data cells comprising a zero generated by a zero formula (i.e., {=0: 0}).

For example, an empty data cell in the copy-from data set (i.e., a null data cell) would generate a first key length of zero. In some embodiments, a zero is prevented from occurring in the denominator of the scoring formula (complexity+shortness penalty)/(first key length) by adding a criterion in FIG. 14 to select only non-empty data cells from the portion of the copy-from data set. In some embodiments, a zero is prevented from occurring in the denominator of the scoring formula by adding a non-zero positive value to the first key length within the scoring formula. In some embodiments, a zero denominator in the scoring formula returns a value NaN (Not a Number), wherein NaN is a value of the numeric data type representing an undefined or unrepresentable value. In some embodiments, Nan is programmed to return the value FALSE when compared to other numeric scores. In some embodiments, it is determined whether there is any score below a threshold value or that returns the value FALSE.

In response to determining that there is not any score below a threshold value, control passes to 1422. In response to determining that there is any score below a threshold value, control passes to 1418.

In 1418, a smart lookup formula using the efficient formula with the lowest score is generated. In some embodiments, when determining the lowest score, wherein one or more scores comprise NaN, NaN is determined to not be lower than the lowest score. In some embodiments, when determining whether the lowest score is below a threshold value, NaN is determined to be above the threshold value.

For example, the smart lookup formula WD.SMARTLOOKUP(REGEXREPLACE(E8,"\-"," "),$B$15#,1,3) is generated using the efficient formula REGEXREPLACE (E8,"\-"," "), wherein the efficient formula has a lowest score (e.g., 0.222). That is, WD.SMARTLOOKUP (REGEXREPLACE(E8,"\-"," "),$B$15#,1,3) generates the squish value '11122333' from E8 in the paste-to data set of FIG. 13A which matches the first key value of '111223333' in B16 of the copy-from data set of FIG. 13B. In this example, the Formula 1 column of the example paste-to data set of FIG. 13A would not be required for the process of FIG. 14 to generate an efficient formula.

In 1420, the smart lookup formula is provided to an other formula cell, and the process ends. In some embodiments, the other formula cell comprises the formula cell into which the user initially provided the input string. For example, a smart lookup formula that returns the value in the copy-from data set associated with '111223333' (e.g., that returns the value 'qualified' associated with the value '111223333' in the copy-from data set of FIG. 13B) is provided to the formula cell of the paste-to data set, and the process ends. In some embodiments, the other formula cell is not the formula cell into which the user initially provided the input string. For example, the other formula cell is adjacent to the formula cell into which the user initially provided the input string, in a different column from the formula cell into which the user initially provided the input string, or any other appropriate formula or data cell.

In some embodiments, wherein one or more smart lookup formulas are determined, the user is given a choice to select one of the one or more smart lookup formulas to enter into the other formula cell.

In some embodiments, when the smart lookup formula is provided to the other formula cell, a computer program is triggered to automatically provide the smart lookup formula to other formula cells within the data set (e.g., to formula cells associated with the data cell). In some embodiments, the smart lookup formula is automatically adjusted to reference a source data within the data set so as to provide a second key. For example, the smart lookup formula is automatically adjusted to reference the source data cell in the paste-to data set to generate a second key associated with the formula cell that is mapped one-to-one with a first key in the copy-to data set that is associated with the copy-from value.

In 1422, an error message is provided, and the process ends. For example, an error message is provided to the user indicating no smart lookup formula was found, and the process ends.

Figure 15:
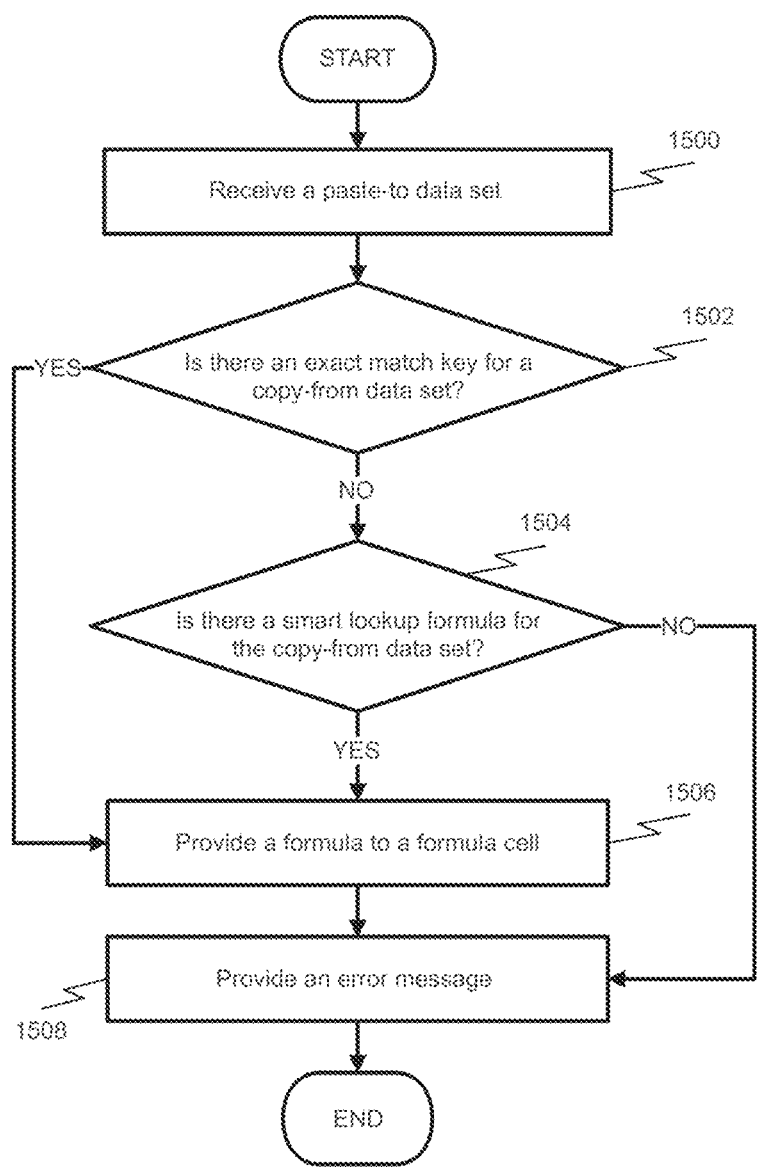
FIG. 15 is a flow diagram illustrating an embodiment of a process for providing a formula for a paste-to data cell.

FIG. 15 is a flow diagram illustrating an embodiment of a process for providing a formula for a paste-to data cell. In some embodiments, the process of FIG. 15 calls the process of FIG. 12 to determine an exact match key and the process of FIG. 14 to determine a smart lookup formula. In the example shown, in 1500 a paste-to data set is received. For example, a paste-to data cell of a paste-to data set is received. In 1502, it is determined whether there is an exact match key for a copy-from data set. In some embodiments, a formula is provided using the exact match key for the copy-from data set. In some embodiments, determining the formula comprises determining whether a non-empty data cell exactly matches a data cell value from a portion of the paste-to data cell. In some embodiments, in response to the non-empty data cell exactly matching a data cell value from a portion of the paste-to data cell, a set of first keys is determined from a portion of the copy-from data set associated with the non-empty data cell that exactly matches the data cell value. In some embodiments, the set of first keys are mapped to the portion of the copy from data set. In some embodiments, in response to the non-empty data cell exactly matching a data cell value from a portion of the paste-to data cell, a second set of keys is determined from a portion of a paste-to data set associated with the non-empty data cell that exactly matches the data cell value. In some embodiments, the formula is generated that returns data values from the copy-from data set. In some embodiments, each data value returned is mapped to a first key that corresponds to a second key in a paste-to data set associated with the paste-to data cell. In response to determining that there is the exact match key for the copy-from data set, control passes to 1506. In response to determining that there is not the exact match key for the copy-from data set, then control passes to 1504.

In 1504, it is determined whether there is a smart lookup formula for the copy-from data set. In some embodiments, determining the smart formula comprises determining an efficient formula from the lexicon that matches a value in the paste-to data cell. In some embodiments, determining the smart formula comprises determining a score for the efficient formula. In some embodiments, determining the smart formula comprises tracking the score and the efficient formula. In some embodiments, determining the smart formula comprises determining whether the score is below a threshold. In some embodiments, in response to determining that the score is below the threshold, the efficient formula is provided with a lowest score to a formula cell. In some embodiments, in response to determining that the score is not below the threshold, an error message is provided. In response to determining that there is a smart lookup formula for the copy-from data set, control passes to 1506. In 1506, a formula is provided to a formula cell. For example, the formula generated that returns data values from the copy-from data set and is provided to the formula cell associated with the paste-to data cell. In response to determining that there is not a smart lookup formula for the copy-from data set, control passes to 1508. In 1508, an error message is provided. For example, an error message indicating that neither an exact match nor a smart formula was found relating the copy-from data cell/area with the paste-to data cell/area.

In some embodiments, in the event that more than one smart formula (i.e., a set of smart formulas) are identified, the more than one smart formulas are presented to a user to determine which formula is to be used. In some embodiments, a selection or suggestion is automatically made based at least in part on a scoring or rating of the formula. In some embodiments, the more than one smart formula are checked for all the data available to determine which smart formulas are considered candidates and the ones not passing the check are removed from the set of smart formulas presented to a user for selection. In some embodiments, more than one row or set of data are used in parallel to determine the smart formula. For example, a smart formula is determined using two or three or more rows of data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to:
copy a text string value of a first cell of a paste-from data set into a first cell of a paste-to data set, wherein:
the paste-from data set and the paste-to data set are arranged in rows and columns;
a portion of the paste-to data set in a same row and to the left of the first cell of the paste-to data set is related to the first cell of the paste-to data set; and
a portion of the paste-from data set in the same row as the first cell of the paste-from data set is related to the first cell of the paste-from data set; and
a processor configured to:
determine whether there is an exact text string match between any cell value from the portion of the paste-from data set and any cell value from the portion of the paste-to data set;
in response to a determination that there is not an exact text string match:
select a selected cell of the portion of the paste-from data set, wherein the selected cell comprises a second text string value;
determine a lexicon from the portion of the paste-to data set; and
determine whether there is an efficient formula for the selected cell, wherein the efficient formula generates the second text string value using the lexicon; and
in response to a determination that there is the efficient formula, provide the efficient formula to a formula cell of the paste-to data set; and
a memory coupled to the processor and configured to provide the processor with instructions.

2. The system of claim 1, wherein the processor is further configured to determine a set of first keys from the paste-from data set, wherein the set of first keys is associated with the selected cell.

3. The system of claim 2, wherein the set of first keys is mapped to the paste-from data set.

4. The system of claim 2, wherein a set of second keys is determined from the paste-to data set, wherein the set of second keys is associated with the formula cell.

5. The system of claim 4, wherein the processor is further configured to return data values from the paste-from data set to the paste-to data set.

6. The system of claim 5, wherein each data value returned is mapped to a first key of the set of first keys and a second key of the set of second keys.

7. The system of claim 1, wherein the processor is further configured to determine a smart lookup formula using the efficient formula.

8. The system of claim 1, wherein the processor is further configured to determine a score for the efficient formula.

9. The system of claim 8, wherein the processor is further configured to track the score and the efficient formula.

10. The system of claim 8, wherein the processor is further configured to determine whether the score is below a threshold.

11. The system of claim 10, wherein the processor is further configured to in response to determining that the score is below the threshold, provide the efficient formula with a lowest score to the formula cell.

12. The system of claim 10, wherein the processor is further configured to in response to determining that the score is not below the threshold, provide an error message.

13. The system of claim 1, wherein the processor is further configured to in response to a determination that there is an exact string match, determine a set of first keys from the paste-from data set, wherein the set of first keys is associated with the any cell value from the portion of the paste-from data set.

14. A method, comprising:
    copying a text string value of a first cell of a paste-from data set into a first cell of a paste-to data set, wherein:
        the paste-from data set and the paste-to data set are arranged in rows and columns;
        a portion of the paste-to data set in a same row and to the left of the first cell of the paste-to data set is related to the first cell of the paste-to data set; and
        a portion of the paste-from data set in the same row as the first cell of the paste-from data set is related to the first cell of the paste-from data set;
    determining whether there is an exact text string match between any cell value from the portion of the paste-from data set and any cell value from the portion of the paste-to data set; and
    in response to a determination that there is not an exact text string match:
        selecting a selected cell of the portion of the paste-from data set, wherein the selected cell comprises a second text string value;
        determining a lexicon from the portion of the paste-to data set;
        determining whether there is an efficient formula for the selected cell, wherein the efficient formula generates the second text string value using the lexicon; and
        in response a determination that there is the efficient formula, providing the efficient formula to a formula cell of the paste-to data set.

15. A computer program product embodied in a non-transitory computer readable medium and comprising computer instructions for:
    copying a text string value of a first cell of a paste-from data set into a first cell of a paste-to data set, wherein:
        the paste-from data set and the paste-to data set are arranged in rows and columns;
        a portion of the paste-to data set in a same row and to the left of the first cell of the paste-to data set is related to the first cell of the paste-to data set; and
        a portion of the paste-from data set in the same row as the first cell of the paste-from data set is related to the first cell of the paste-from data set;
    determining whether there is an exact text string match between any cell value from the portion of the paste-from data set and any cell value from the portion of the paste-to data set; and
    in response to a determination that there is not an exact text string match:
        selecting a selected cell of the portion of the paste-from data set, wherein the selected cell comprises a second text string value;
        determining a lexicon from the portion of the paste-to data set;
        determining whether there is an efficient formula for the selected cell, wherein the efficient formula generates the second text string value using the lexicon; and
        in response a determination that there is the efficient formula, providing the efficient formula to a formula cell of the paste-to data set.

* * * * *